United States Patent
Chida et al.

(10) Patent No.: US 7,410,719 B2
(45) Date of Patent: Aug. 12, 2008

(54) POROUS CARBON BASE MATERIAL, METHOD FOR PREPARATION THEREOF, GAS-DIFFUSING MATERIAL FILM-ELECTRODE JOINTED ARTICLE, AND FUEL CELL

(75) Inventors: Takashi Chida, Shiga (JP); Kenya Okada, Shiga (JP); Mikio Inoue, Shiga (JP); Shinya Isoi, Kyoto (JP)

(73) Assignee: Toray Industries, Inc., Tokyo (JP)

( * ) Notice: Subject to any disclaimer, the term of this patent is extended or adjusted under 35 U.S.C. 154(b) by 248 days.

(21) Appl. No.: 10/550,709

(22) PCT Filed: Mar. 25, 2004

(86) PCT No.: PCT/JP2004/004158

§ 371 (c)(1),
(2), (4) Date: Sep. 26, 2005

(87) PCT Pub. No.: WO2004/085728

PCT Pub. Date: Oct. 7, 2004

(65) Prior Publication Data

US 2006/0180798 A1    Aug. 17, 2006

(30) Foreign Application Priority Data

| Mar. 26, 2003 | (JP) | 2003-084644 |
| Mar. 27, 2003 | (JP) | 2003-087223 |
| Sep. 26, 2003 | (JP) | 2003-334743 |

(51) Int. Cl.
| H01M 4/04 | (2006.01) |
| H01B 1/04 | (2006.01) |
| B32B 9/00 | (2006.01) |
| B32B 5/16 | (2006.01) |
| B32B 15/02 | (2006.01) |
| B32B 17/02 | (2006.01) |
| B32B 19/00 | (2006.01) |
| B32B 21/02 | (2006.01) |
| B32B 23/02 | (2006.01) |
| B32B 27/02 | (2006.01) |
| D02G 3/00 | (2006.01) |

(52) U.S. Cl. .................. 429/44; 252/502; 428/408; 428/402; 428/367

(58) Field of Classification Search .................. None
See application file for complete search history.

(56) References Cited

U.S. PATENT DOCUMENTS

| 4,505,994 | A | * | 3/1985 | Shimada et al. ............. 429/101 |
| 4,740,434 | A | * | 4/1988 | Hirota et al. ................ 429/105 |
| 6,812,171 | B2 | * | 11/2004 | Shimazaki et al. .......... 442/337 |
| 2003/0008195 | A1 | * | 1/2003 | Chiem et al. .................. 429/40 |

FOREIGN PATENT DOCUMENTS

JP        01-077625 A       3/1989

(Continued)

Primary Examiner—Gregg Cantelmo
Assistant Examiner—Eugenia Wang
(74) Attorney, Agent, or Firm—Morrison & Foerster LLP

(57) ABSTRACT

A porous carbon base material includes a sheet containing carbon short fibers dispersed randomly and a carbonized resin, in which the carbon short fibers are bound by the carbonized resin and the volume of pores having a pore diameter of 10 μm or less is 0.05 to 0.16 cc/g. A method for producing this porous carbon base material includes intermittently transporting a precursor fiber sheet including short carbon fibers dispersed randomly and a resin to a space between heated plates, subjecting the precursor to a heating and pressuring treatment by the heated plates while the transformation stops, carrying out the transportation of the sheet after the treatment, and then carrying out a heat treatment, to thereby carbonize the resin in the sheet.

27 Claims, 8 Drawing Sheets

FOREIGN PATENT DOCUMENTS

| | | |
|---|---|---|
| JP | 06-020710 A | 1/1994 |
| JP | 07-220735 A | 8/1995 |
| JP | 07-326362 A | 12/1995 |
| JP | 09-157052 A | 6/1997 |
| JP | 09-324390 A | 12/1997 |
| JP | 2001-196085 A | 7/2001 |
| WO | WO 01/22509 A1 | 3/2001 |
| WO | WO 01/56103 A1 | 8/2001 |
| WO | WO02/42534  * | 5/2002 |

* cited by examiner

POROUS CARBON BASE MATERIAL, METHOD FOR PREPARATION THEREOF, GAS-DIFFUSING MATERIAL FILM-ELECTRODE JOINTED ARTICLE, AND FUEL CELL

TECHNICAL FIELD

The present invention relates to a porous carbon substrate. The porous carbon substrate of the invention comprises short carbon fibers and a carbonized resin, and the short carbon fibers are bound by the carbonized resin. Furthermore, the invention relates to a process for producing the porous carbon substrate of the invention. Moreover, the invention relates to a gas diffusion material, membrane-electrode assembly and fuel cell respectively formed by using the porous carbon substrate of the invention as a gas diffusion material.

BACKGROUND ART

Porous carbon substrates used to constitute a gas diffusion material of fuel cells, respectively obtained by binding carbon fibers by means of a carbonized resin, are described in JP 06-20710 A, JP 07-326362 A and JP 07-220735 A. However, these publicly known porous carbon substrates have such problems that they are inconvenient to handle and that it is difficult to provide them in long continuous forms.

Any of these publicly known porous carbon substrates is produced by a process comprising a paper making step of making carbon fiber paper, a resin impregnation step of impregnating the carbon fiber paper with a thermosetting resin, a compression step of compressing the resin-impregnated carbon fiber paper for forming it, and a carbonization step of burning the compressed resin-impregnated carbon fiber paper provided as a fiber sheet precursor.

The sheet processed in the paper making step and in the resin impregnation step has a continuous and long form. However, the sheet is cut at a predetermined length, before it is supplied to the compression step. The cut sheets, namely, unit sheets are fed to the compression step one by one and each of the unit sheets fed one by one is pressed by a batch type flat plate press. In the subsequent carbonization step, a batch type heating furnace is used for carbonizing the resin. The compression step and the carbonization step are batch processes, since the obtained porous carbon substrate is inconvenient to handle. That is, the reason is that it was difficult to produce a long continuous porous carbon substrate. Therefore, the reason is that a porous carbon fiber substrate wound as a roll could not be produced.

In general, a batch process is low in productivity compared with a continuous process. Also in the above-mentioned carbonization step, the heating rate that can be employed in a batch type heating furnace is up to several degrees centigrade per minute at the highest. Therefore, there are such problems that the productivity of the porous carbon substrate is low and that the production cost is high.

On the other hand, WO 01/56103 A1 discloses an electrode substrate capable of being wound as a roll and a production process thereof. This document proposes to use carbon fibers with a small fiber diameter for enhancing, for example, the bending strength of the sheet. However, if the fiber diameter of carbon fibers is made smaller, the bending modulus of elasticity of the obtained porous carbon substrate tends to be high. That is, there is a problem that a larger force is necessary for winding the substrate as a roll. Furthermore, the porous carbon substrate obtained by using carbon fibers having a small fiber diameter is small in the size of the pores formed in the substrate. Therefore, in the case where the substrate is used as a gas diffusion material, there arises such a problem that, for example, gas diffusibility and water draining capacity decline.

Moreover, the document proposes to use a continuous hot press with a pair of endless belts or a continuous roll press, for allowing continuous operation in the compression step. However, for compression forming of carbon fiber paper containing a thermosetting resin, the state of heating and pressing must be kept for a period of time enough to allow the curing reaction of the resin to progress to some extent, usually for several minutes to tens of minutes. Therefore, an apparatus for applying a pressure to a sheet as a linear pressure like the belt press or roll press has a problem that it is difficult to compress a fiber sheet precursor for forming it at a thickness accuracy equivalent to that of a batch type flat plate press.

Still furthermore, the document proposes to burn the sheet in a continuous burning furnace, for allowing continuous operation in the carbonization step. Certainly, continuous burning can remarkably enhance the productivity compared with that of batch type. However, if the productivity is enhanced, the thermosetting resin contained in the fiber sheet precursor is suddenly carbonized. Therefore, if a continuous burning furnace is merely used, there arise such problems that the separation at the interfaces where the carbonized resin and the carbon fibers are bound to each other occurs considerably and that the carbonized resin is remarkably cracked, respectively due to the sudden carbonization shrinkage of the resin.

SUMMARY OF THE INVENTION

The present invention has been completed to solve the above-mentioned problems of the prior art. An object of the invention is to provide a porous carbon substrate that is highly convenient to handle, can be supplied as a roll, is little separated at the interfaces where the carbon fibers and the carbonized resin are bound to each other, and is little cracked in the carbonized resin.

Another object is to provide a porous carbon substrate structurally optimized in view of gas and water diffusion and transport for assuring high cell characteristics.

A further object is to provide a process for producing a porous carbon substrate, which allows a porous carbon substrate to be produced at high productivity and at low cost.

The porous carbon substrate of the invention is convenient to handle. The porous carbon substrate of the invention can be wound as a roll. Therefore, when the porous carbon substrate of the invention is used to produce a product, the porous carbon substrate of the invention can be unwound from a roll package by a required length and can be supplied to a production process.

Furthermore, the porous carbon substrate of the invention has such a feature that the separation at the interfaces where the short carbon fibers and the carbonized resin are bound to each other and the cracking of the carbonized resin slightly occurs.

The porous carbon substrate of the invention can be preferably used as a gas diffusion material of a solid polymeric fuel cell.

A porous carbon substrate of the invention comprises a sheet having short carbon fibers dispersed in random directions and containing a carbonized resin, in which the short carbon fibers are bound by the carbonized resin; the sheet has pores; and the volume of the pores with pore sizes of 10 μm and less among the pores per unit weight of the sheet is from 0.05 to 0.16 cc/g.

It is preferred that the thickness of the porous carbon substrate of the invention is from 0.10 to 0.25 mm.

It is preferred that the porosity of the porous carbon substrate of the invention is from 70 to 90%

It is preferred that the average fiber diameter of the short carbon fibers in the porous carbon substrate of the invention is from 5 to 20 μm.

It is preferred that the porous carbon substrate of the invention contains a carbonaceous powder.

It is preferred that the maximum bending load of the porous carbon substrate of the invention, measured by a three-point bending test, is from 0.25 to 2.0 N/cm.

It is preferred that the maximum bending load displacement of the porous carbon substrate of the invention, measured by a three-point bending test, is from 0.7 to 2.3 mm.

It is preferred that the bending modulus of elasticity of the porous carbon substrate of the invention, measured by a three-point bending test, is from 1 to 15 GPa.

It is preferred that the particle diameter of the carbonaceous powder contained in the porous carbon substrate of the invention is from 0.01 to 10 μm.

It is preferred that the carbonaceous powder contained in the porous carbon substrate of the invention is a powder of graphite or carbon black.

It is preferred that the amount of the carbonaceous powder contained in the porous carbon substrate of the invention is from 1 to 60 wt %.

It is preferred that the average fiber length of the short carbon fibers contained in the porous carbon substrate of the invention is from 3 to 20 mm.

It is preferred that the density of the porous carbon substrate of the invention is from 0.3 to 0.7 g/cm$^3$.

It is preferred that the peak pore size of the pores in the porous carbon substrate of the invention is from 25 to 55 μm.

A gas diffusion material of the invention comprises the porous carbon substrate of the invention and a water repellent material added to the substrate.

A gas diffusion material of the invention comprises the porous carbon substrate of the invention and a conductive gas diffusion layer formed at least on one side of the substrate.

A gas diffusion material of the invention comprises the porous carbon substrate of the invention having a water repellent material added to it and a conductive gas diffusion layer formed at least on one side of the substrate.

A membrane-electrode assembly of the invention comprises a solid polymeric electrolyte membrane, catalyst layers containing catalyst-loaded carbon provided on both the surfaces of the membrane, and gas diffusion materials provided in contact with both the catalyst layers, wherein at least one of the gas diffusion materials is the gas diffusion material of the invention.

A fuel cell of the invention includes a membrane-electrode assembly of the invention.

A porous carbon substrate production process of the invention for producing the porous carbon substrate of the invention is explained below.

The process for producing the porous carbon substrate of the invention comprises a compression step for treating a fiber sheet precursor comprising short carbon fibers and a resin for compressing it and a carbonization step for treating the resin of the compressed fiber sheet precursor for carbonizing it, wherein in the compression step, the fiber sheet precursor is intermittently carried and passed between hot plates positioned in parallel to each other, and heated and pressed by the hot plates while they are stopped, then being carried again after completion of heating and pressing, to repeat the carrying and stopping alternately. This process is called the first production process.

In the first production process, it is preferred that the fiber sheet precursor contains a carbonaceous powder.

In the first production process, it is preferred that the resin is a thermosetting resin.

In the first production process, it is preferred that the fiber sheet precursor contains a carbonaceous powder and that the resin is a thermosetting resin.

In the first production process, it is preferred that a post-curing step for post-curing the thermosetting resin is provided between the compression step and the carbonization step.

A process for producing the porous carbon substrate of the invention comprises a compression step for treating a fiber sheet precursor comprising short carbon fibers and a resin for compressing it and a carbonization step for treating the resin of the compressed fiber sheet precursor for carbonizing it, wherein the fiber sheet precursor contains a carbonaceous powder. This process is called the second production process.

In the second production process, it is preferred that the resin is a thermosetting resin.

In the second production process, it is preferred that a post-curing step for post-curing the thermosetting resin is provided between the compression step and the carbonization step.

A process for producing the porous carbon substrate of the invention comprises a compression step for treating a fiber sheet precursor comprising short carbon fibers and a resin for compressing it and a carbonization step for treating the resin of the compressed fiber sheet precursor for carbonizing it, wherein the resin is a thermosetting resin. This process is called the third production process.

In the third production process, it is preferred that a post-curing step for post-curing the thermosetting resin is provided between the compression step and the carbonization step.

In the first, second or third production process, it is preferred that the fiber sheet precursor is continuously carried in the carbonization step.

In the first production process, it is preferred that the value of LF/LP is from 0.1 to 0.98, where LP is the effective pressing length of the hot plates in the carrying direction and LF is the feed distance of the fiber sheet precursor when the precursor is carried intermittently.

In the first production process, it is preferred that the temperature of the hot plates is from 140 to 300° C. and that the pressing pressure of the hot plates is from 0.1 to 40 MPa.

In the first, second or third production process, it is preferred that the fiber sheet precursor is paper in which the short carbon fibers are bound by a binder.

In the first, second or third production process, it is preferred that the amount of the thermosetting resin is from 20 to 300 parts by weight while the amount of the carbonaceous powder is from 1 to 200 parts by weight per 100 parts by weight of the short carbon fibers of the fiber sheet precursor.

In the first, second or third production process, it is preferred that the fiber sheet precursor is heated at a heating rate of 10 to 1,000° C./min up to at least a temperature of 1,200° C., for carbonizing the thermosetting resin.

In the first, second or third production process, it is preferred that the particle diameter of the carbonaceous powder is from 0.01 to 10 μm. Furthermore, it is preferred that the carbonaceous powder is a powder of graphite or carbon black.

In the first, second or third production process, it is preferred that the average fiber diameter of the short carbon fibers is from 5 to 20 μm.

In the first, second or third production process, it is preferred that the average fiber length of the short carbon fibers is from 3 to 20 mm.

In the first, second or third production process, it is preferred that the thermosetting resin is a phenol resin. Furthermore, it is preferred that the phenol resin is a phenol resin synthesized without using a metal catalyst or an alkali catalyst.

In the first, second or third production process, it is preferred that the curing degree of the thermosetting resin is 70% or more.

In the first, second or third production process, it is preferred that the heating temperature of the fiber sheet precursor in the post-curing step is from 140 to 300° C.

In the first, second or third production process, it is preferred that the fiber sheet precursor has the thermosetting resin carbonized by heating at a heating rate of 500 to 10,000° C./min up to at least 1,200° C.

In the first, second or third production process, it is preferred that the highest temperature of the heating temperature in the carbonization step is from 1,200 to 2,500° C.

The definitions and/or measuring methods of various characteristic values relating to porous carbon substrates are as follows.

The volume of the pores with pore sizes of 10 μm and less among the pores formed in a porous carbon substrate is obtained by measuring the pore size distribution by the following mercury penetration method.

Three about 12 mm×about 20 mm quadrangular specimens are cut out from a porous carbon substrate and accurately weighed, then being put in a measuring cell without overlying on each other, and under reduced pressure, mercury is injected. Then, the pore size distribution is measured using the instrument shown in Table 1 under the conditions shown in Table 1. The measurement is performed once only.

TABLE 1

| Instrument | Pore Sizer 9320 produced by Micromeritics |
|---|---|
| Measuring pressure range | About 3.7 KPa to 207 MPa (pore diameter from about 70 nm to 400 μm) |
| Measuring mode | Pressure rise process in the above pressure range |
| Cell volume | 5 cm$^3$ |

The pore size of all the pores in a porous carbon substrate is a representative value expressed using the value of the peak size obtained by measuring the pore size distribution. Therefore, this representative value is called the peak pore size.

The thickness of a porous carbon substrate is measured using a micrometer by applying a plane pressure of 0.15 MPa in the thickness direction of the substrate. The measurement is repeated 20 times, and the mean value is employed as the thickness.

The porosity of a porous carbon substrate is calculated from the true density and the apparent density of the substrate. The true density can be measured by the well-known flotation method or pycnometer method, etc. Furthermore, the apparent density is calculated from the thickness of the substrate and the weight per unit area of the substrate. For the true density, the measurement is repeated twice, and the mean value is used. For the weight per unit area, a 10 cm×10 cm square porous carbon substrate is weighed 10 times, and the mean value is used for calculation. The density in the invention refers to the apparent density.

The average fiber diameter of short carbon fibers is obtained by selecting 10 given short carbon fibers from a 5,000-fold magnified cross-sectional photograph showing the fibers of a substrate, taken by using an electron microscope, and measuring the diameters of the fibers, to obtain the simple mean value. In the case where the cross-sectional form of a fiber is not circular, for example, is ellipsoidal, the mean value of the major axis and the minor axis is employed as the diameter of the fiber. If a carbonized resin portion is confirmed on an electron microscope photograph, whether or not a conductive powder (for example, a carbonaceous powder) exists can be confirmed.

For the particle diameter of a carbonaceous powder, when a porous carbon substrate is produced, the dynamic light scattering of the added carbonaceous powder is measured, and the number average particle diameter of the obtained particle diameter distribution is employed.

For the average fiber length of short carbon fibers, a short-carbon-fiber sheet is heated in air at 600° C. to leave short carbon fibers by burning away the binder and others than the fibers. Then, from the remaining fibers, given 30 short carbon fibers are selected, and a 5-fold magnified photograph of them is taken using an optical microscope. The lengths of the respective short carbon fibers are measured on the photograph, and the number average value is obtained.

For measuring the amount of a carbonaceous powder in weight percentage, the weight of the carbonaceous powder in a porous carbon substrate is obtained from the weight (Wc) of the carbonaceous powder used for producing the porous carbon substrate, and from the weight (Wa) of the porous carbon substrate, the amount in weight percentage is obtained from the following formula (I).

$$\text{Amount of carbonaceous powder in weight percentage (\%)} = Wc \div Wa \times 100 \quad \text{(I)}$$

The maximum bending load, maximum bending load displacement and bending modulus of elasticity of a porous carbon substrate are obtained from the following three-point bending test.

The three-point bending test is performed according to the method specified in JIS K 6911. In this case, a specimen has a width of 15 mm, a length of 40 mm and an inter-supporting-point distance of 15 mm. Furthermore, the radii of curvature of the supporting points and indenters are 3 mm, and the loading rate is 2 mm/min. In the measurement of maximum load and bending modulus of elasticity, in the case where the substrate is anisotropic, the direction in which the bending modulus of elasticity is highest is considered as the length direction of the specimen. In the case where the substrate is isotropic, the length direction of the long porous carbon substrate obtained by the method described later is considered as the length direction of the specimen. In the three-point bending test, the load and the displacement at the point where the load becomes the largest are the maximum bending load and the maximum bending load displacement respectively.

The curing degree of the thermosetting resin contained in a fiber sheet precursor is obtained from the following formula (II) on the assumption that the thermosetting resin is uniformly deposited on the fiber sheet precursor.

$$\text{Curing degree (\%)} = (Qa - Qb) \div Qa \times 100 \quad \text{(II)}$$

where $Qa$ is the residual curing calorific value per unit weight of the resin-impregnated fiber sheet precursor not yet heated or pressed and $Qb$ is the residual curing calorific value per unit weight of the fiber sheet precursor, the curing degree of which is to be obtained.

The residual calorific value of a fiber sheet precursor is measured based on a method of differential scanning calorimetry (DSC method) using an apparatus and conditions shown in Table 2.

TABLE 2

| | |
|---|---|
| Instrument | Pyris 6 DSC produced by Perkin-Elmer |
| Atmosphere | Nitrogen stream (50 ml/min) |
| Heating rate | 10° C./min |
| Cooling rate | 10° C./min |
| Temperature range | −20 to 300° C. |
| Amount of sample | 2 to 6 mg |
| Sample container | Aluminum container |

The heating rate for burning a fiber sheet precursor is obtained from the following formula (III) using the temperature at the inlet of a heating furnace, the highest temperature in the heating furnace, and the time taken for the sheet introduced from the inlet of the heating furnace to move to the highest temperature region (moving time). In this case, the inlet of a heating furnace is the region on the inlet side of the heating furnace where the atmosphere changes from air to an inert atmosphere.

$$V=(T2-T1)/t \tag{III}$$

where V: heating rate (° C./min), T1: temperature at the inlet of the heating furnace (° C.), T2: the highest temperature in the heating furnace (° C.), t: moving time (min)

Meanwhile, it is not necessary that only one heating furnace is used, and two or more heating furnaces can be used for multi-stage burning. In the case where two heating furnaces are used, the heating rate of the first heating furnace is obtained from the formula (III), and the heating rate of the second heating furnace is obtained with T1 of the formula (III) as the highest temperature of the former heating furnace, i.e., the highest temperature of the first heating furnace. A similar method is employed also in the case where three or more heating furnaces are used.

DETAILED DESCRIPTION OF THE INVENTION

Figure 1:
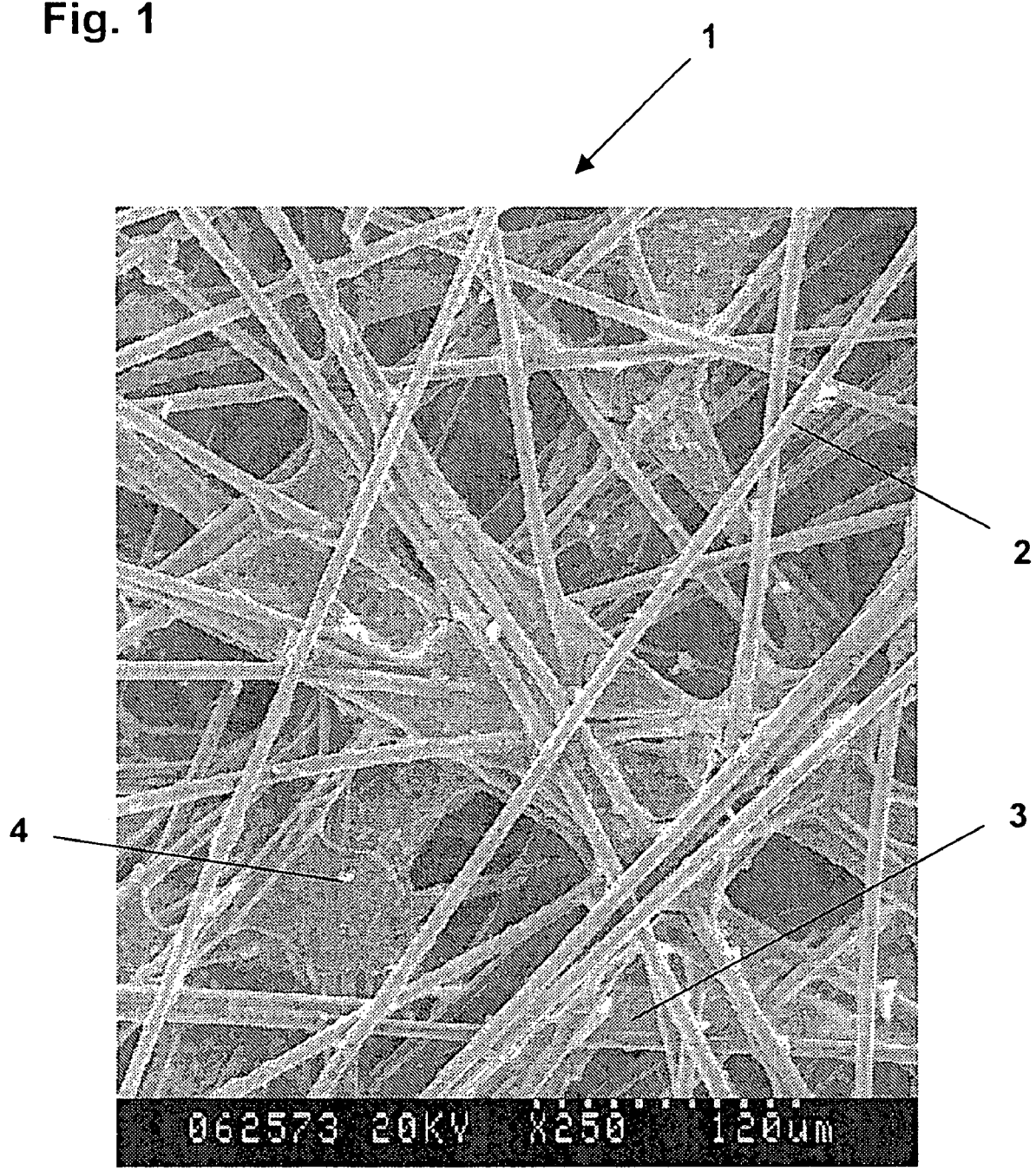
FIG. 1 is an electron microscope photograph (magnification 250-fold) showing the state of fibers on the surface of the porous carbon substrate of the invention as an example.

FIG. 1 shows an electron microscope photograph showing the surface of a porous carbon substrate 1 of the invention. The porous carbon substrate 1 is a sheet containing linear-looking short carbon fibers 2 and a carbonized resin 3. The short carbon fibers 2 are positioned as dispersed in random directions. The short carbon fibers 2 are bound by the carbonized resin 3. The granular material dispersed in the carbonized resin 3 is a carbonaceous powder 4.

The state in which the short carbon fibers are dispersed in random directions can be formed by dispersing the short carbon fibers at random by the paper making method described later. The sheet obtained, for example, by treating the short-carbon-fiber sheet in this state by means of water jet entanglement has the short fibers oriented not only in the in-plane direction of the sheet but also in the thickness direction of the sheet. This state is also included in the state in which short carbon fibers are dispersed in random directions.

In the porous carbon substrate 1 of the invention, the volume of the pores with pore sizes of 10 μm and less among the pores formed in the substrate 1 per unit weight of the substrate 1 is from 0.05 to 0.16 cc/g.

Figure 2:
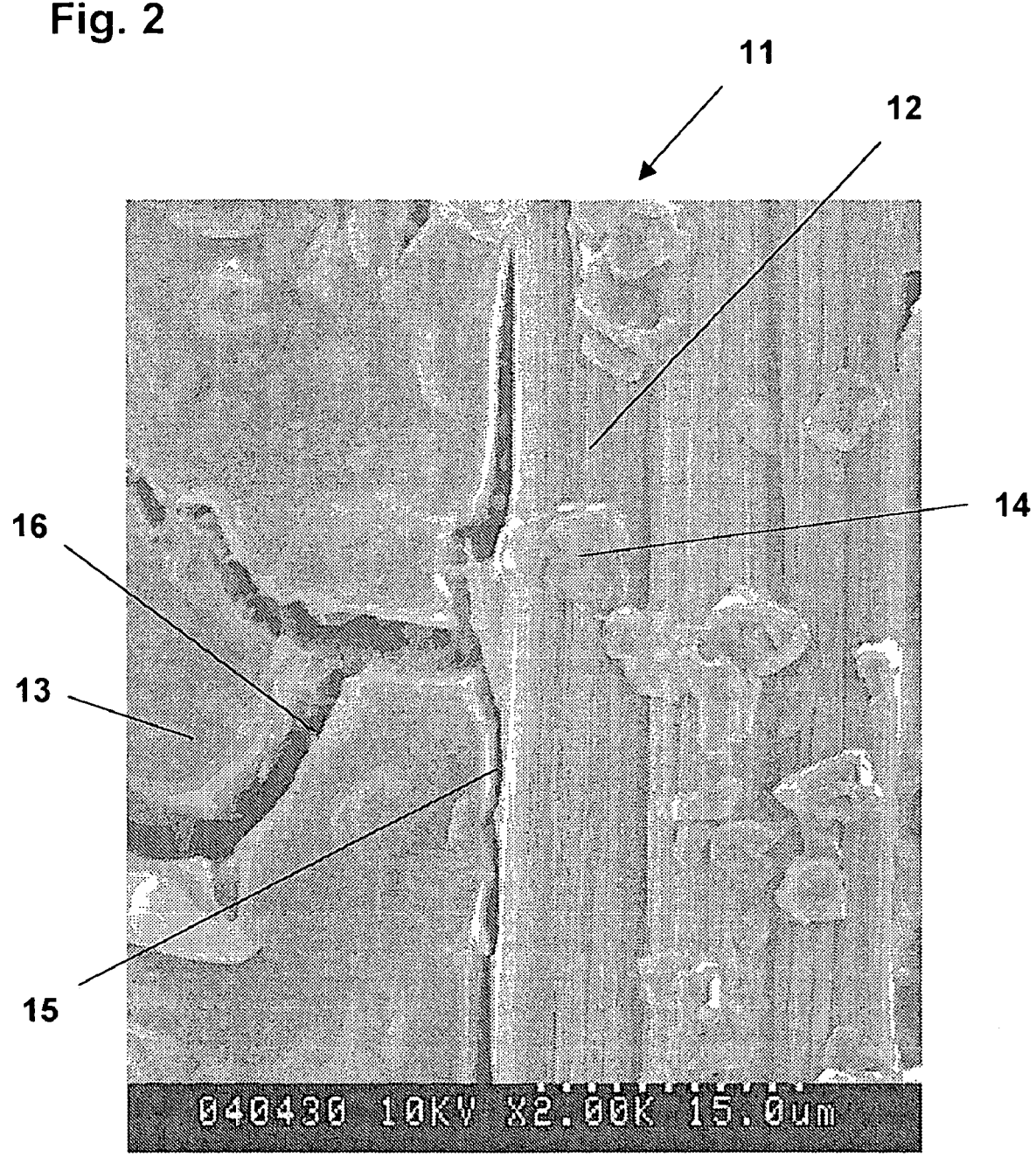
FIG. 2 is an electron microscope photograph (magnification 2,000-fold) showing the state of fibers on the surface of the porous carbon substrate of the invention as another example.

FIG. 2 is an electron microscope photograph showing the surface of a porous carbon substrate 11 of the invention. It is considered that the formation of the pores with pore sizes of 10 μm and less was caused in the portion 15 where the short carbon fibers 12 and the carbonized resin 13 were separated from each other and in the portion 16 where the carbonized resin 13 was cracked, respectively as shown in FIG. 2. The carbonaceous powder 14 can be observed in the substrate 11.

Figure 3:
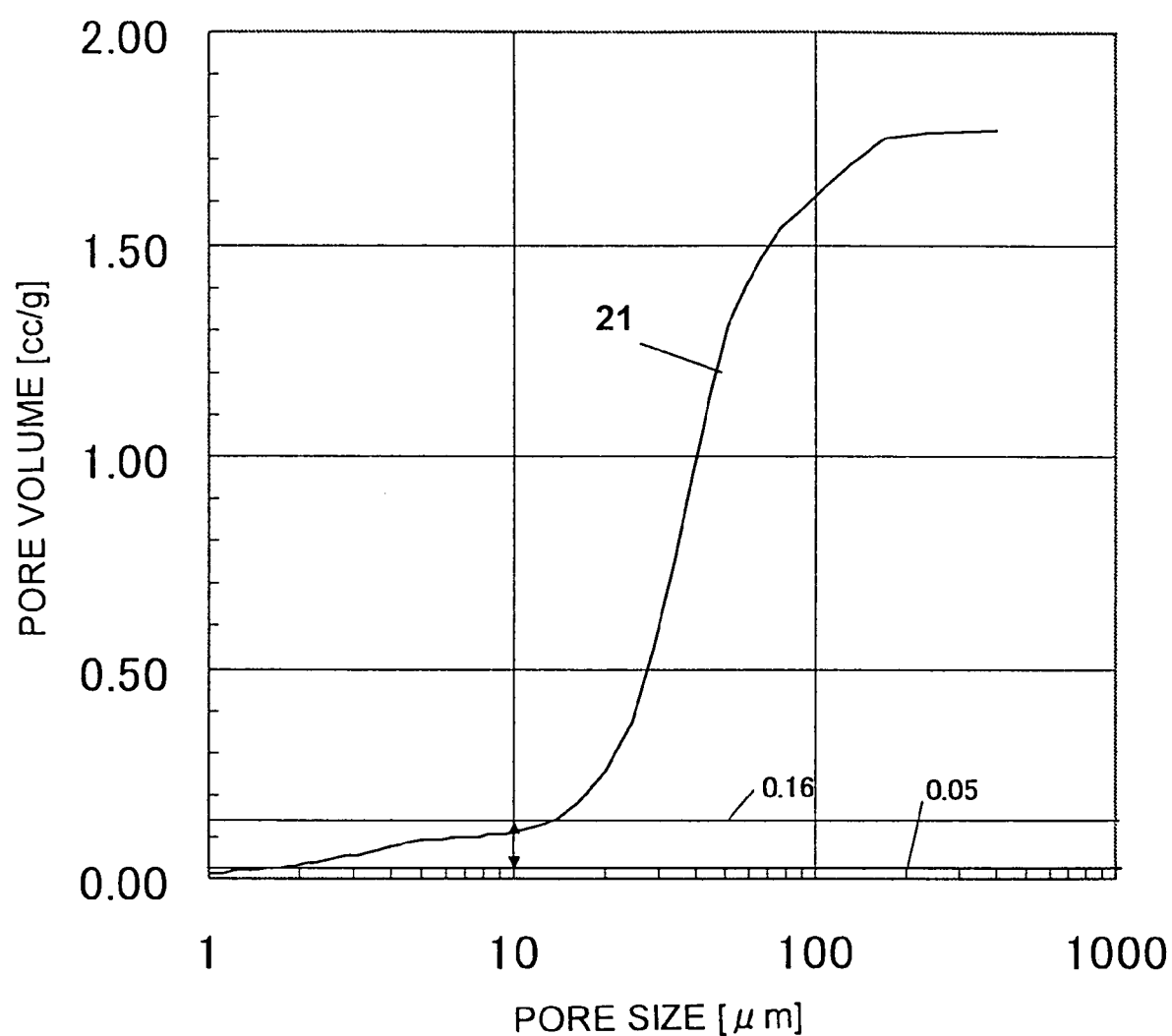
FIG. 3 is a graph showing the relation between the pore volume and the pore size of the porous carbon substrate of the invention as an example.

The results of the pore size distribution of the porous carbon substrate of the invention obtained in Example 2 described later, as measured by the mercury penetration method, are shown in FIG. 3. In the graph of FIG. 3, the pore size (μm) is chosen as the abscissa, and the pore volume (cc/g), as the ordinate. Curve 21 shows the pore volume integrated from small pore size to large pore size. If separated portions 15 and cracked portions 16 increase, the total pore volume of the pores with pore sizes of 10 μm and less increases. If the volume of the pores with pore sizes of 10 μm and less is 0.16 cc/g or less, the large decline of conductivity of the substrate 1 caused when the substrate 1 is treated to be water-repellent using a fluorine resin or the like can be inhibited. If the volume of the pores with pore sizes of 10 μm and less is 0.05 cc/g or more, the portions where the short carbon fibers 2 and the carbonized resin 3 are bound to each other decrease to improve the flexibility of the substrate 1 and to facilitate the production of the substrate 1 as a roll. A more preferred range of the volume of the pores with pore sizes of 10 μm and less is from 0.06 to 0.15 cc/g, and a furthermore preferred range is from 0.07 to 0.14 cc/g. The porous carbon substrate 1 that can be easily produced as a roll can be produced continuously to greatly enhance the productivity of the substrate and to reduce the cost compared with batch production.

It is preferred that the thickness of the porous carbon substrate 1 is from 0.10 to 0.25 mm. The thickness of the substrate 1 relates to the cracking and flexibility shown by the substrate 1 when a shearing force acts on it. In the case where the thickness is less than 0.10 mm, when the shearing force from a separator acts on the substrate 1 in a fuel cell produced using a gas diffusion material produced using the substrate 1, the substrate 1 is easily broken. Furthermore, in the case where the thickness is more than 0.25 mm, the flexibility of the substrate 1 greatly declines, and it is difficult to wind it as a roll. A more preferred thickness range of the substrate 1 is from 0.11 to 0.22 mm, and a further more preferred thickness range is from 0.12 to 0.16 mm.

It is preferred that the density of the porous carbon substrate 1 is from 0.3 to 0.7 g/cm$^3$. A more preferred range is from 0.32 to 0.60 g/cm$^3$, and a further more preferred range is from 0.34 to 0.60 g/cm$^3$. A density of more than 0.70 g/cm$^3$ is not preferred, for such a reason that when the substrate 1 is used as a gas diffusion material of a fuel cell, water draining capacity becomes so low as to cause flooding, thereby lowering the cell characteristics. A density of less than 0.30 g/cm$^3$ is not preferred either, since the gas diffusibility becomes so high as to dry the solid polymeric membrane, for increasing the resistance of the membrane, thereby lowering the cell characteristics.

It is preferred that the porosity of the porous carbon substrate 1 is from 70 to 90%. If the porosity of the substrate 1 is 90% or less, the draining of water from inside the fuel cell can be inhibited to prevent that the solid polymeric electrolyte is dried to lower the proton conductivity. If the porosity of the substrate 1 is 70% or more, the gas diffusibility can be enhanced to enhance the power generation efficiency. A more preferred porosity range is from 72 to 88%, and a further more preferred range is from 75 to 85%.

It is preferred that the average fiber diameter of the short carbon fibers 2 used in the porous carbon substrate 1 of the invention (the average fiber diameter of single fibers) is from 5 to 20 μm. If the average fiber diameter is less than 5 μm, the flexibility of the substrate 1 may decline though depending on the kind of the carbon fibers, etc. Furthermore, if the average fiber diameter is more than 20 μm, the mechanical strength of the substrate 1 may decline. A more preferred average fiber diameter range is from 6 to 13 μm, and a further more preferred range is from 6 to 10 μm.

The short carbon fibers 2 are usually obtained by cutting long carbon fibers at a desired length. It is preferred that the average fiber length of the short carbon fibers 2 is from 3 to 20 mm. If the average fiber length is less than 3 mm, mechanical properties such as the maximum load for the bending of the substrate 1 may decline. Furthermore, if the average fiber length is more than 20 mm, the fiber dispersibility during the paper making described later becomes insufficient, and the weight per unit area of the short carbon fibers 2 in the substrate 1 becomes very irregular. A more preferred average fiber length range is from 4 to 17 mm, and a further more preferred range is from 5 to 15 mm.

It is preferred that the peak pore size of the porous carbon substrate 1 is from 25 to 55 μm. A more preferred range is from 27 to 50 μm, and a further more preferred range is from 30 to 45 μm. In the case where the peak pore size is less than 25 μm, when the porous carbon substrate 1 is used as a gas diffusion material of a fuel cell, water draining capacity becomes so low as to cause flooding, thereby lowering the cell characteristics. In the case where the peak pore size is more than 55 μm, the gas permeability becomes so high as to dry the solid polymeric membrane, for increasing the resistance of the membrane, thereby lowering the cell characteristics. So, a preferred peak pore size range for maintaining both the contradictory functions of proton conductivity and gas permeability in the solid polymeric membrane is from 25 to 55 μm.

As carbon fibers used as the short carbon fibers 2, polyacrylonitrile (PAN)-based carbon fibers, pitch-based carbon fibers, rayon-based carbon fibers and the like can be used. Among them, PAN-based carbon fibers and pitch-based carbon fibers, especially PAN-based carbon fibers are preferred, since the substrate 1 obtained can have excellent mechanical strength and adequate flexibility.

It is preferred that the porous carbon substrate 1 contains a carbonaceous powder 4. The carbonaceous powder 4 contained can enhance the conductivity of the substrate 1 per se, and can reduce the cracking of the carbonized resin 3, being able to inhibit the decline of conductivity caused by water repellent treatment.

Preferred examples of the carbonaceous powder 4 include the powders of carbon black, graphite, expanded graphite, carbonaceous milled fibers, etc. Among them, the powders of carbon black and graphite are more preferred, and graphite powder is most preferred.

It is preferred that the amount of the carbonaceous powder 4 is in a range from 1 to 60 wt %. A more preferred range is from 10 to 55 wt %, and a further more preferred range is from 20 to 50 wt %. The most preferred range is from 15 to 35 wt %.

If the amount of the carbonaceous powder 4 is too small, the conductivity of the substrate 1 declines. If it is too large, the density of the substrate 1 becomes high, and a suitable peak pore size cannot be obtained, lowering the cell characteristics. If the substrate 1 contains the carbonaceous powder 4, the conductivity in the thickness direction of the substrate 1 can be enhanced. Furthermore, in the case where the heating rate is high when the resin is carbonized, there arise such problems that the resin portion is cracked, that the conductivity in the thickness direction of the obtained substrate 1 declines, and that the bending strength declines. However, if the substrate 1 contains the carbonaceous powder 4, the cracking of the resin in the case where the heating rate is high can be prevented.

To obtain the effect, it is preferred that the particle diameter of the carbonaceous powder 4 is from 0.01 to 10 μm. A more preferred range is from 0.1 to 7 μm, and a further more preferred range is from 1 to 5 μm for enhancing the bending strength of the substrate 1 and for obtaining a suitable peak pore size.

It is preferred that the maximum bending load of the porous carbon substrate 1 is from 0.25 to 2.0 N/cm. A more preferred range is from 0.27 to 1.0 N/cm, and a further more preferred range is from 0.30 to 0.70 N/cm. If the maximum bending load is 0.25 N/cm or more, the porous carbon substrate 1 is unlikely to be broken, and becomes more convenient to handle. However, since the bending modulus of elasticity of the substrate 1 tends to be high according to the increase of the maximum bending load, it is preferred that the maximum bending load is 2.0 N/cm or less.

It is preferred that the maximum bending load displacement of the porous carbon substrate 1 is from 0.7 to 2.3 mm. A more preferred range is from 1.0 to 2.0 mm, and a further-more preferred range is from 1.3 to 1.8 mm. If the maximum bending load displacement is 0.7 mm or more, the substrate 1 is unlikely to be broken when it is wound as a roll, and the substrate 1 can be easily wound as a roll. However, since the maximum bending load tends to decline according to the increase of maximum bending load displacement, it is preferred that the maximum bending load displacement is 2.3 mm or less.

It is preferred that the bending modulus of elasticity of the porous carbon substrate 1 is from 1 to 15 GPa. A more preferred range is from 3 to 14 GPa, and a further preferred range is from 5 to 13 GPa. If the bending modulus of elasticity is 15 GPa or less, the flexibility of the substrate 1 increases. So, the substrate 1 can be easily wound as a roll. However, it is not preferred that the bending modulus of elasticity is less than 1 GPa, since the substrate 1 is so soft as to lower the function as a support, to shorten the life of the fuel cell.

The maximum bending load, maximum bending load displacement and bending modulus of elasticity are indicators as to how convenient the porous carbon substrate 1 is to handle. The porous carbon substrate 1 of the invention satisfying these properties can be produced by selecting the thickness and density of the substrate 1, the average fiber diameter of the short carbon fibers used in the substrate 1, etc. based on the following conditions.

Figure 7:
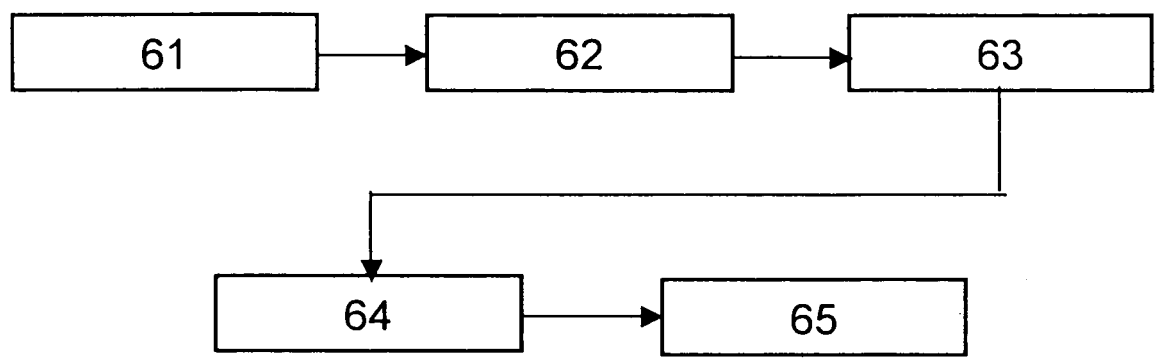
FIG. 7 is a process chart for explaining an embodiment of the process for producing a porous carbon substrate of the invention.

Next, the process for producing the porous carbon substrate 1 of the invention is described. FIG. 7 is a process chart for explaining one embodiment of the process for producing the porous carbon substrate 1 of the invention. In FIG. 7, the process for producing the porous carbon substrate of the invention comprises the steps established one after another from the upstream side to the downstream side. That is, it comprises a paper making step 61 for forming a sheet in which short carbon fibers are dispersed in random directions, a resin impregnation step 62 for impregnating the obtained sheet with a resin, a compression step 63 for treating the obtained resin-impregnated sheet (fiber sheet precursor) for compressing it, a post-curing step 64 for curing the resin, established as required, and a carbonization step 65 for carbonizing the resin of the compressed fiber sheet precursor.

Figure 8:
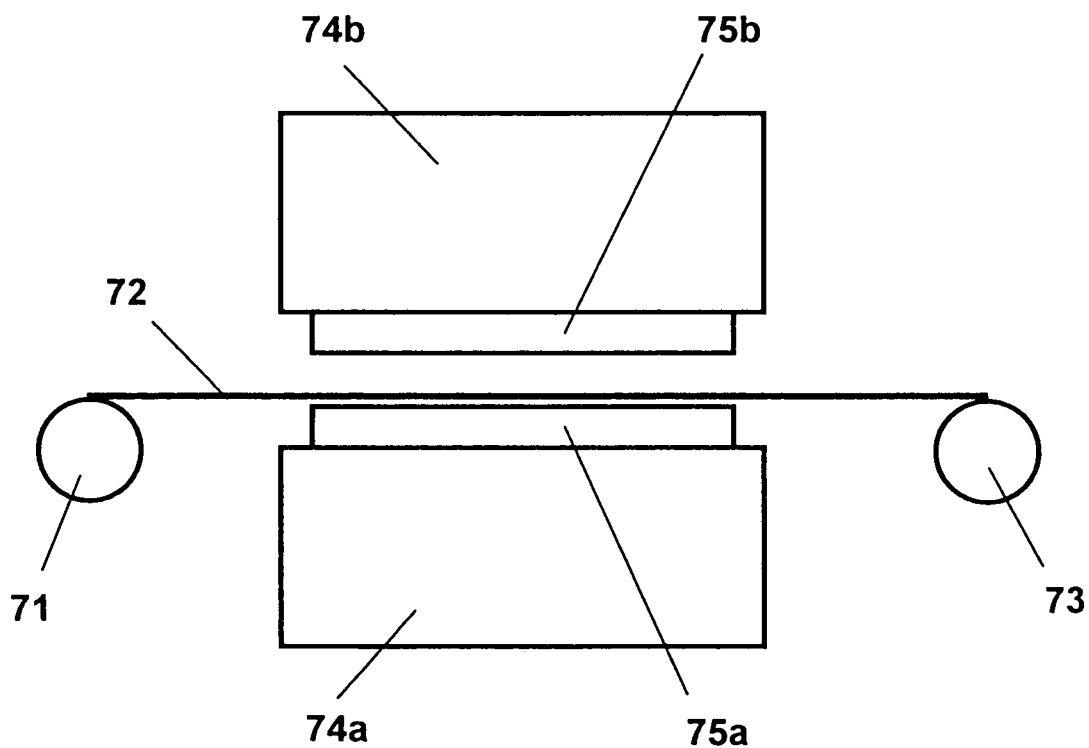
FIG. 8 is a schematic vertical sectional view for explaining an embodiment of the compression step in an embodiment of the process for producing a porous carbon substrate of the invention.

The first production process for the porous carbon substrate 1 of the invention is characterized by the compression step 63 shown in FIG. 7. FIG. 8 shows an example of the compressor (hot presses) used in the compression step 63.

The first production process comprises the compression step 63 for compressing the fiber sheet precursor comprising short carbon fibers and a resin and the carbonization step 65 for burning the fiber sheet precursor compressed in the compression step to carbonize the resin, while the fiber sheet precursor passes continuously through a heating furnace. This production process allows the production of, for example, a porous carbon substrate 1 with a thickness of 0.10 to 0.25 mm and a density of 0.3 to 0.7 g/cm³.

In this production process, as shown in FIG. 8, a fiber sheet precursor 72 intermittently unwound by a predetermined length from the fiber sheet precursor roll installed on an unwinder 71 is continuously heated and pressed by a hot plate 75a installed on the top face of a hot press 74a and a hot plate 75b installed under the bottom face of a hot press 74b. The faces facing each other of the hot plates 75a and 75b are disposed in parallel to each other, and the fiber sheet precursor 72 is heated and pressed while receiving their plane pressures. While the fiber sheet precursor 72 is moved by a predetermined length, the hot plates 75a and 75b are kept away from each other to allow the movement of the sheet 72.

In this case, the continuous heating and pressing refers to the following. While the fiber sheet precursor 72 is treated for being heated and pressed by the hot presses 74a and 74b, the movement of the fiber sheet precursor 72 in the longitudinal direction is stopped. When the hot presses 74a and 74b are kept away from each other after completion of the heating and pressing treatment, the fiber sheet precursor 72 is moved in the longitudinal direction and wound by a predetermined length around the fiber sheet precursor roll installed on a sheet winder 73, while a predetermined length of the fiber sheet precursor 72 to be subsequently treated for being heated and pressed is unwound from the fiber sheet precursor roll installed on the unwinder 71.

In other words, the continuous heating and pressing means that though the fiber sheet precursor is moved intermittently by a predetermined length and is stopped while it is treated for being heated and pressed, the fiber sheet precursor to be treated for being compressed in the entire compression step is continuous from the unwinder 71 to the winder 73 while it is heated and pressed.

In the conventional belt press or roll press, the fiber sheet precursor is treated for being pressed while it is continuously moved in the longitudinal direction, but in this case, the fiber sheet precursor is pressed at a linear pressure. In this conventional method, it is difficult to form the fiber sheet precursor at the thickness accuracy equivalent to that of the batch type flat plate press that presses each of the unit fiber sheet precursors fed one by one.

According to the first production process, while the fiber sheet precursor 72 is intermittently carried, that is, while the movement and stop of the fiber sheet precursor 72 in the compression step 63 are alternately repeated, the fiber sheet precursor 72 is treated for being heated and pressed. So, the long fiber sheet precursor 72 continuous in the carrying direction is continuously treated for being heated and pressed (treated for being densified), without being cut into unit sheets.

In this case, if the effective pressing length in the carrying direction is LP and the feed distance of the intermittently carried fiber sheet precursor 72 is LF, then it is preferred that the value of LF/LP is from 0.04 to 0.98. A more preferred range is from 0.05 to 0.45. If the value of LF/LP is too small, the time required for joining and separating the hot presses 74a and 74b and feeding the fiber sheet precursor 72 relatively to the treatment time increases to lower the production efficiency, though the densification effect by heating and pressing can be more averaged. Furthermore, if the value of LF/LP exceeds 0.98, a problem that a portion remains non-pressed can occur when the value of LF/LP exceeds 1 due to a feed distance error, etc.

In this case, the effective pressing length LP refers to the length of the portion of the fiber sheet precursor 72 kept in contact with the hot plates 75a and 75b for being heated and pressed. Furthermore, the feed distance LF refers to the distance of the fiber sheet precursor 72 carried (or taken up) each time in the carrying direction while the hot presses 74a and 74b are kept away from each other.

As the heating and pressing conditions by the hot plates 75a and 75b parallel to each other, it is preferred that the temperature is from 140 to 300° C., that the plane pressure is from 0.1 to 40 MPa and that the heating and pressing time is from 0.2 to 15 minutes.

The hot plates 75a and 75b parallel to each other mean that the parallelism is 1 mm or less at least in an area corresponding to 50% or more of the hot plates. The parallelism refers to the difference between the maximum value and the minimum value of the thicknesses of lead pieces deformed when heated and pressed between the hot plates. The materials of the hot plates 75a and 75b can be the same, but different materials can also be used. For example, one hot plate can be made of stainless steel, while the other hot plate can be made of silicone rubber.

It is preferred that the treatment temperature of the heating and pressing treatment is from 160 to 300° C. A more preferred range is from 170 to 230° C. If the temperature is too low, the effect of densifying the fiber sheet precursor by heating and pressing is insufficient, and especially if the temperature is lower than 140° C., the effect is small. If the temperature is too high, the oxidation of the fiber sheet precursor in air takes place and such a problem as strength decline occurs.

It is preferred that the plane pressure during the heating and pressing treatment is from 2 to 25 MPa. A more preferred range is from 3 to 15 MPa, and a further more preferred range is from 4 to 8 MPa. If the pressure is too low, the effect of densifying the fiber sheet precursor is insufficient. If the pressure is too high, linear patterns considered to be attributable to the buckling of fibers or the separation between fibers are formed when the fiber sheet precursor is bent.

Furthermore, the gas permeability of the porous carbon substrate declines after burning, and the substrate cannot exhibit good properties as a gas diffusion material of the fuel cell. Moreover, there arises such a problem that the fiber sheet precursor adheres to the press faces working as pressing faces or to release paper. Still furthermore, since press equipment is required to press 1 m$^2$ at 25 MPa, a pressing pressure of 2,550 tf is necessary. So, it is necessary to use a large-scale press system or to make the area to be treated each time smaller at the sacrifice of production efficiency.

It is preferred that the heating and pressing time is from 1.5 to 10 minutes. A more preferred range is from 3.5 to 6 minutes. If the heating and pressing time is short, the effect of densifying the fiber sheet precursor by heating and pressing cannot be sufficiently obtained. Furthermore, even if the time is more than 6 minutes, it cannot be expected that the densification effect can be further enhanced.

Hitherto the continuous treatment for densifying the fiber sheet precursor not yet burned could not be realized because of lack of any concrete means, though such treatment has been desired. However, it can be realized now if the fiber sheet precursor not yet burned is continuously heated and pressed by means of hot plates parallel to each other, while it is intermittently carried as described above.

The fiber sheet precursor can be paper obtained by binding chopped yarns of carbon fibers (short fibers) or the like using a binder such as a phenol resin or PVA resin.

Examples of the resin contained in the fiber sheet precursor include thermosetting resins such as epoxy resins, unsaturated polyester resins, phenol resins, polyimide resins and melamine resin and thermoplastic resins such as acrylic resin, polyvinylidene chloride resin and polytetrafluoroethylene resin. Any of these resins contained in the fiber sheet precursor is generally impregnated in the sheet, but it can also be contained as fibers in the sheet.

The resin can remain uncured or unsolidified when used, but in the case where an uncured or unsolidified resin is used, it is preferred that it can be cured or solidified as soon as it is treated for being compressed. In the case where the resin is uncured or unsolidified, it is preferred that the plane pressure of the heating and pressing by means of hot plates parallel to each other is from 0.1 to 3 MPa for preventing the resin runoff during the heating and pressing. A more preferred range is from 0.2 to 1.5 MPa.

Figure 9:
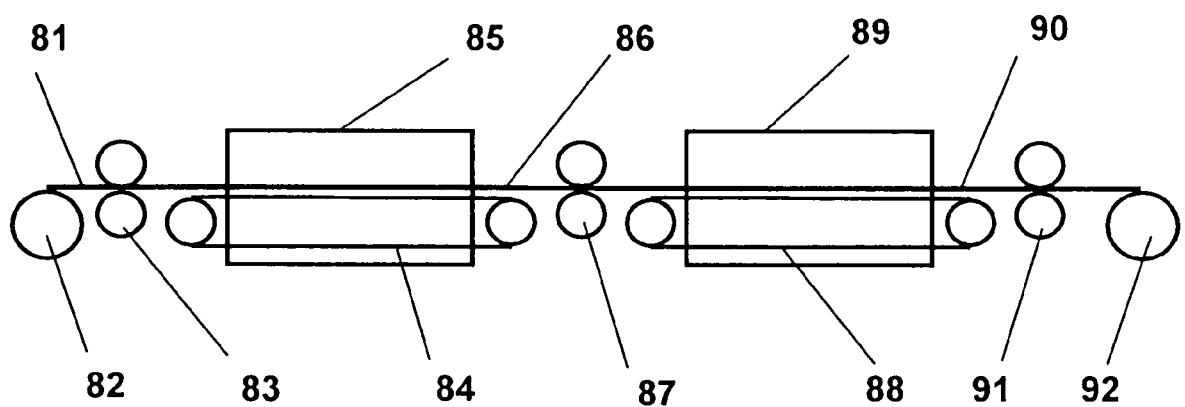
FIG. 9 is a schematic vertical sectional view for explaining an embodiment of the carbonization step in an embodiment of the process for producing a porous carbon substrate of the invention.

An example of the carbonization step 65 is shown in FIG. 9. In FIG. 9, the compressed fiber sheet precursor 81 (the fiber sheet precursor wound around the winder 73 of FIG. 8) is unwound from the winder 82 and carried by carrier rolls 83, being introduced into a heating furnace 85 (heating furnace for pre-carbonization treatment) by an endless conveyor belt 84. The heating furnace 85 contains an inert gas atmosphere with a temperature of 300 to 1,200° C., and the compressed fiber sheet precursor 81 is treated for being pre-carbonized while it is carried under no tension by the endless conveyor belt 84.

The pre-carbonized fiber sheet precursor 86 is then introduced into the next heating furnace 89 (heating furnace for carbonization treatment) by carrier rolls 87 and an endless conveyor belt 88. The heating furnace 89 has also the same constitution as that of the heating furnace 85, but the atmosphere is an inert gas atmosphere with a temperature of 1,200 to 3,000° C. The pre-carbonized fiber sheet precursor 86 is treated for being carbonized to be a porous carbon substrate 90 while it is carried under no tension by the endless conveyor belt 88. The porous carbon substrate 90 is carried, for example, to a winder 92 by carrier rolls 91.

The compression step 63 using hot plates parallel to each other and the carbonization step 65 using a heating furnace for pre-carbonization treatment and a heating furnace for carbonization treatment are respectively independently performed. If the respective steps are independent like this, the respective treatments can be performed at the speeds suitable for the respective steps, and optimum equipment scales can be easily employed for the respective steps. However, the production process is not limited to this mode, and the sheet can also be made to pass continuously through the respective steps, without being wound as a roll in the respective steps.

The second production process for the porous carbon substrate 1 of the invention is characterized by the addition of a carbonaceous powder in the resin impregnation step 62 of FIG. 7 and by the optimization of burning conditions in the carbonization step 65.

The second production process comprises an intermediate substrate production process comprising the paper making step 61, the resin impregnation step 62 and the compression step 64, and the carbonization step 65 for carbonizing the obtained intermediate substrate (fiber sheet precursor). The resin impregnation step 62 is characterized in that the short-carbon-fiber sheet obtained in the paper making step 61, in which short carbon fibers are dispersed in random directions, is impregnated with a mixture comprising a thermosetting resin and a carbonaceous powder. Furthermore, the carbonization step 65 is characterized in that the sheet containing the thermosetting resin and the carbonaceous powder is heated to carbonize the thermosetting resin. In the carbonization step, if a continuous burning furnace is merely used, the sudden carbonization shrinkage of the resin may cause substantial separation at the interfaces where the carbonized resin and carbon fibers are bound to each other or may cause remarkable cracking in the carbonized resin portions. This problem is solved by the second production process.

The intermediate substrate production process has a first step of producing a short-carbon-fiber sheet and a second step of impregnating the short-carbon-fiber sheet with a resin.

The first step comprises a step for homogeneously dispersing the carbon fibers cut at a suitable length (short carbon fibers) into water, a step for collecting the dispersed carbon fibers on a wire screen as a paper sheet, a step of immersing the short-carbon-fiber sheet collected as a paper sheet into an aqueous dispersion of polyvinyl alcohol, and a step of pulling up and drying the immersed sheet. The polyvinyl alcohol in the first step serves as a binder for binding the short carbon fibers to each other. In the first step, the short carbon fibers dispersed in random directions are bound by a binder to produce a short-carbon-fiber sheet.

The second step comprises a step for immersing the short-carbon-fiber sheet produced in the first step in a dispersion obtained by dispersing a carbonaceous powder in a solution of a thermosetting resin, a step for pulling up the immersed sheet and drying it at 90° C. for 3 minutes, and a step of applying a pressure of 0.69 MPa at a temperature of 145° C. to the dried sheet for 25 minutes, for curing the thermosetting resin (for example, a resol phenol resin). After completion of the second step, the production of the sheet-like intermediate substrate is completed.

It is preferred that the intermediate substrate contains 20 to 300 parts by weight of a thermosetting resin and 1 to 200 parts by weight of a carbonaceous powder per 100 parts by weight of carbon fibers. It is more preferred that the intermediate substrate contains 30 to 250 parts by weight of a thermosetting resin and 10 to 160 parts by weight of a carbonaceous powder. It is further more preferred that the intermediate substrate contains 40 to 200 parts by weight of a thermosetting resin and 20 to 120 parts by weight of a carbonaceous powder.

If the amount of the thermosetting resin is too small, the obtained porous carbon substrate is so thick as to lower the conductivity in the thickness direction. If the amount of the thermosetting resin is too large, the density of the obtained porous carbon substrate is so high as to make the pore size too small, for lowering the water draining capacity when the substrate is used as a gas diffusion material of a fuel cell, thereby lowering the cell characteristics.

If the amount of the carbonaceous powder is too small, the effect of enhancing the conductivity of the obtained porous carbon substrate cannot be obtained. If the amount of the carbonaceous powder is too large, as in the case of the thermosetting resin, the density of the obtained porous carbon substrate is so high as to make the pore size too small.

It is preferred that the length of the short carbon fibers is from 3 to 20 mm. A more preferred range is from 5 to 15 mm. In this case, when the short-carbon-fiber sheet is obtained by a paper making technique from a dispersion with short carbon fibers dispersed in it, the dispersibility of the short carbon fibers in the dispersion can be improved.

It is preferred that the fiber diameter of the short carbon fibers is from 5 to 20 μm. A more preferred range is from 5 to 13 μm. Especially in the case where the fiber diameter is from 5 to 10 μm, pores with a suitable pore size can be easily formed in the obtained porous carbon substrate.

Examples of the carbonaceous powder include the powders of graphite, carbon black, carbonaceous milled fibers and expanded graphite. To enhance the conductivity and to obtain a suitable pore size, it is preferred to use the powder of graphite or carbon black. It is more preferred to use the powder of graphite.

It is preferred that the amount of the carbonaceous powder is from 1 to 60 wt %. A more preferred range is from 10 to 55 wt %, and a further more preferred range is from 20 to 50 wt %. If the amount of the carbonaceous powder is too small, the conductivity of the obtained porous carbon substrate declines. If it is too large, the density of the obtained porous carbon substrate becomes so high that a suitable pore size cannot be obtained, thereby lowering the cell characteristics.

If a carbonaceous powder is used, the conductivity of the porous carbon substrate in the thickness direction can be enhanced. Furthermore, in the case where the heating rate in the carbonization step is too high, there arise such problems that the resin portions are cracked, that the conductivity of the substrate in the thickness direction declines, and that the bending strength declines. However, if a carbonaceous powder is used, the cracking of the resin can be prevented even if the heating rate is high.

To obtain this effect, it is preferred that the particle diameter of the carbonaceous powder is from 0.01 to 10 μm. A more preferred range is from 0.01 to 7 μm. It is furthermore preferred that the particle diameter of the carbonaceous powder is from 0.01 to 5 μm, for enhancing the bending strength of the substrate and for obtaining a suitable pore size.

Examples of the thermosetting resin include phenol resins, epoxy resins, etc. It is more preferred to use a phenol resin, since the amount of the carbonized resin is so large as to enhance the bending strength and to enhance the conductivity in the thickness direction.

It is preferred that the phenol resin is a phenol resin synthesized without using a metal catalyst or an alkali catalyst. Examples of the phenol resin include novolak phenol resin synthesized using an acid catalyst, alkali resol phenol resin synthesized using an alkali catalyst, ammonia resol phenol resin synthesized using an ammonia catalyst, etc.

If the phenol resin contains ions of sodium, calcium, etc., there arises a problem that these metal ions lower the proton conductivity of the solid polymeric electrolyte membrane, to lower the cell characteristics.

So, as the phenol resin, it is preferred to use ammonia resol phenol resin R or novolak phenol resin N. In view of higher bending strength, it is preferred to use a mixture comprising them. As for their mixing ratio, if the amount of R is too large, the bending strength of the substrate becomes low, and the electric resistance in the thickness direction becomes high. If the amount of N is too large, the mixed resin is not sufficiently solidified in the subsequent heating step and becomes difficult to handle, and the carbon content remaining when the resin is carbonized becomes small. So, a range of R:N=2:1 to 1:3 is preferred. A range from R:N=3:2 to 1:2 is more preferred.

It is preferred that the amount of the carbonaceous powder is 300 parts by weight or less per 100 parts by weight of the phenol resin. A more preferred range is 200 parts by weight or less, and a further more preferred range is 150 parts by weight or less. If the amount of the carbonaceous powder in reference to the amount of the resin is too large, the carbonized resin cannot sufficiently bind the carbon fibers and the carbonaceous powder together, and a problem that the carbonaceous powder comes off arises.

The obtained sheet-like intermediate substrate is treated for being carbonized as the fiber sheet precursor in the carbonization step 65. In the duration, the thermosetting resin is heated and carbonized.

It is preferred that the heating rate in the carbonization step 65 is from 10 to 1,000° C./min. A more preferred range is from 50 to 750° C./min, and a further more preferred range is from 100 to 500° C./min. If the heating rate is too low, the productivity declines. If it is too high, the porous carbon substrate becomes thick to lower the conductivity in the thickness direction, since the shrinkage percentage caused by carbonation is small.

It is preferred that the heating temperature in the carbonization step 65 is 1,200° C. or higher. More preferred is 1,500° C. or higher, and furthermore preferred is 1,800° C. or higher. If the heating temperature is too low, the impurity in the heated porous carbon substrate remains considerably, and when the substrate is used as a gas diffusion material of a fuel cell, the impurity inhibits the proton conduction of the solid polymeric membrane, to lower the cell characteristics. It is preferred that the heating temperature is 2,500° C. or lower. More preferred is 2,200° C. or lower, and further more preferred is 2,000° C. or lower.

The third production process for the porous carbon substrate of the invention is characterized by the post-curing step 64 of FIG. 7 and the enhancement of heating rate in the carbonization step 65.

The third production process is a process in which a fiber sheet precursor containing paper (sheet) produced by binding short carbon fibers by means of a binder and a thermosetting resin is continuously carried in a heating furnace while being burned to produce a porous carbon substrate, characterized in that the curing degree of the thermosetting resin contained in the fiber sheet precursor not yet burned is kept at 70% or more.

If the curing degree of the thermosetting resin is kept at 70% or more, the transformation of the covalent bonds in the resin into a three-dimensional network progresses to inhibit the thermal decomposition of the resin during burning, for thereby enhancing the carbonization yield of the resin. Since the carbonization shrinkage of the resin during burning is inhibited as a result, the separation at the interfaces where the carbon fibers and the carbonized resin are bound to each other, and the cracking of the carbonized resin, respectively in the porous carbon substrate, can be inhibited.

If the curing degree is less than 70%, the carbonization yield of the resin declines to increase the separation and cracking of the carbonized resin. It is more preferred that the curing degree of the thermosetting resin contained in the fiber sheet precursor is 80% or more. Further more preferred is 90% or more, and most preferred is 100%. A curing degree of 100% refers to a state where the curing reaction of the resin has perfectly taken place, and where the peak due to the residual curing calorific value of the resin cannot be seen in the above-mentioned DSC method.

Figure 6:
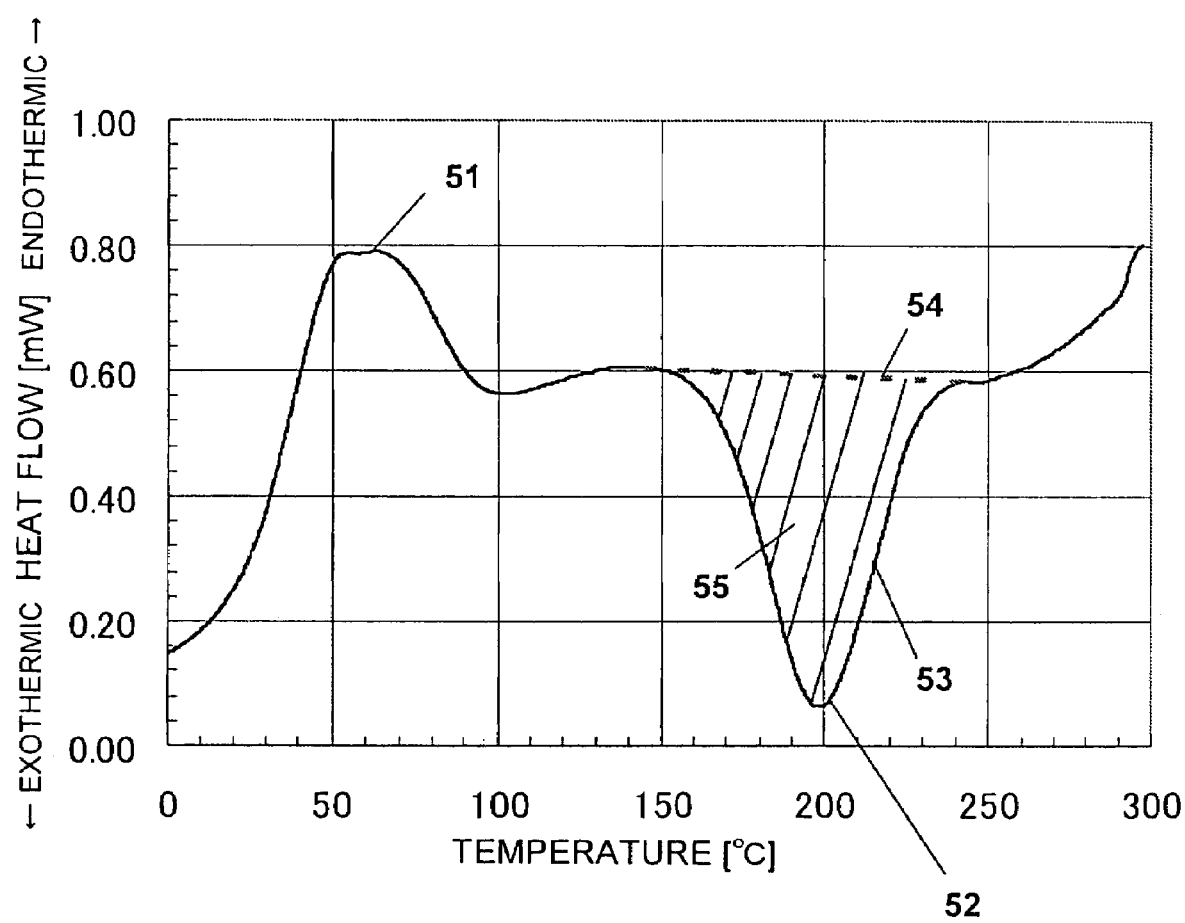
FIG. 6 is a graph showing the results of measuring the residual curing calorific values of a fiber sheet precursor by DSC method as an example.

The results of measuring the residual curing calorific value of the fiber sheet precursor by the DSC method as an example are shown in FIG. 6. In FIG. 6, the temperature (° C.) is chosen as the abscissa, and the heat flow (mW), as the ordinate. In the axis of ordinates, the top is the endothermic side, and the bottom is exothermic side. The fiber sheet precursor impregnated with the resin and not yet heated or pressed in Example 1 described later was used as the sample.

In FIG. 6, the crest peak 51 existing in a temperature range from 50 to 60° C. indicates the endothermic peak due to the volatilization of the remaining solvent contained in the fiber sheet precursor, and the trough reverse peak 52 existing near 200° C. indicates the exothermic reverse peak due to the curing reaction of the thermosetting resin contained in the fiber sheet precursor. An auxiliary line 54 is drawn as a broken line to connect the top ends on both sides of the trough formed by a partial curve 53 including the trough reverse peak 52. The area of the hatched portion 55 surrounded by the curve 53 and the broken line 54, the heating rate shown in Table 2 (10° C./min) and the amount of the sample (2.6 mg) were used to calculate the residual curing calorific value Qa. The calculated value was 46 J/g. The residual curing calorific value Qb per unit weight of the fiber sheet precursor, the curing degree of which is to be obtained, can also be obtained similarly. Based on the obtained Qa and Qb, the formula (II) can be used to obtain the curing degree.

For keeping the curing degree at 70% or more, it is preferred that the post-curing step 64, in which the fiber sheet precursor obtained by impregnating the short-carbon-fiber paper with a thermosetting resin and heating and pressing is further heated at a temperature of 140 to 300° C., is provided between the compression step 63 and the carbonization step 65.

It is more preferred that the heating temperature in the post-curing step 64 is from 160 to 280° C. A furthermore preferred range is from 180 to 260° C. For efficiently promoting the curing reaction, it is preferred that the heating temperature in the post-curing step 64 is set at a temperature higher than the temperature for compressing and forming the fiber sheet precursor by heating and pressing. If the heating temperature in the post-curing step 64 is lower than 140° C., the progress of the curing reaction becomes slow. If it is higher than 300° C., the oxidation of the fiber sheet precursor progresses, to cause such a problem as strength decline.

It is preferred that the heating time of the fiber sheet precursor in the post-curing step 64 is from 1 to 180 minutes. A more preferred range is from 2 to 120 minutes, and a further more preferred range is from 3 to 60 minutes. If the heating time is less than one minute, the progress of curing is insufficient. If it is more than 180 minutes, the strength of the fiber sheet precursor is lowered by oxidation, and furthermore, the productivity of the porous carbon substrate is lowered.

The heating in the post-curing step 64 can be performed by letting the fiber sheet precursor travel continuously in an oven set at the temperature or by placing the fiber sheet precursor as wound as a roll in an oven set at the temperature for batch operation.

Even if the third production process is used to enhance the curing degree of the thermosetting resin contained in the fiber sheet precursor and to inhibit the carbonization shrinkage during burning for enhancing the heating rate in the continuous burning, a process for producing a porous carbon substrate 1 having satisfactory physical properties maintained can be provided.

It is preferred that the heating rate is from 500 to 10,000° C./min. A more preferred range is from 700 to 6,000° C./min, and a further more preferred range is from 1,000 to 4,000° C./min.

As described above, if the curing degree of the thermosetting resin is kept at 70% or more, the separation and cracking of the carbonized resin due to the sudden carbonization shrinkage of the thermosetting resin during continuous burning can be prevented, and furthermore, the heating rate during the continuous burning can be raised, that is, the productivity of the porous carbon substrate can be enhanced to reduce the production cost.

EXAMPLES

The electric resistances and fuel cell voltages in the following examples were measured using the following methods.

Measurement of Electric Resistance:

A porous carbon substrate was immersed in a PTFE aqueous dispersion and pulled up for being dried. The amount of the PTFE deposited on the porous carbon substrate was kept at 20 wt %. The obtained substrate was heat-treated at 380° C. From the heat-treated substrate, a 2.0 cm×2.5 cm specimen was cut out.

The specimen was held between two gold-plated stainless steel electrodes, and with a pressure of 1.0 MPa applied, a current of 1 A was fed between the electrodes to measure the voltage drop caused in this case. The electric resistance value was obtained based on the following formula (IV) using the measured voltage drop value.

$$R = V \times 2.0 \times 2.5 \times 1{,}000 \qquad (IV)$$

where R: electric resistance (mΩ·cm$^2$) V: voltage drop (V).

In the case where a porous carbon substrate is used as a gas diffusion material of a fuel cell, generally a fluorine resin or the like is used to make the substrate water-repellent. The electric resistance of the porous carbon substrate treated to be water-repellent, in the thickness direction as a gas diffusion material, indicates the voltage drop due to the ohmic loss of the fuel cell. A lower electric resistance was judged to be more excellent.

Measurement of Fuel Cell Voltage:

At first, a gas diffusion material was prepared as described below. A porous carbon substrate was immersed in a PTFE aqueous dispersion and pulled up and dried. The amount of PTFE deposited on the porous carbon substrate was kept at 20 wt %. The obtained substrate was coated with a mixture comprising carbon black and PTFE and heated-treated at 380° C., to form a gas diffusion layer on the substrate.

The ratio of carbon black to PTFE in the mixture was 8:2, and the amount applied to the substrate was about 2 mg/cm$^2$.

Meanwhile, a mixture comprising carbon loaded with platinum as a catalyst and Nafion was deposited on both sides of a Nafion 112 (produced by E. I. du Pont de Nemours and Company) membrane, to prepare a membrane-catalyst sheet.

The loaded amount of platinum as a catalyst was about 0.5 mg/cm$^2$. The membrane-catalyst sheet was held between two carbon-coated substrates with their carbon layers turned inside, and the laminate was heated at a temperature of 130° C. and pressed at a pressure of 3 MPa for integration, to obtain a membrane-electrode assembly (MEA).

The MEA was held between grooved separators, and according to a conventional method, the voltage at a current density of 1 A/cm$^2$ was measured. Humidification was performed at a cell temperature of 70° C. and a hydrogen gas temperature of 80° C., and the gas pressure was atmospheric pressure. At 1 A/cm$^2$, the hydrogen utilization ratio was 70% while the air utilization ratio was 40%. A higher voltage measured was judged to be more excellent.

Example 1

Carbon fibers (polyacrylonitrile-based carbon fibers "Torayca" T-300-6K produced by Toray Industries, Inc., average single fiber diameter 7 μm, number of single fibers 6,000) were cut at a length of 12 mm, and paper was produced continuously from them using water as a dispersion media. The paper was immersed in 10 wt % polyvinyl alcohol aqueous dispersion, and dried, to produce long short-carbon-fiber paper with a unit short-carbon-fiber weight of about 32 g/m$^2$. It was wound as a roll. The amount of deposited polyvinyl alcohol corresponded to 20 parts by weight in reference to 100 parts by weight of the short-carbon-fiber paper.

A dispersion obtained by mixing graphite powder (flaky graphite BF-5A produced by K.K. Chuetsu Kokuen Kogyosho, average particle diameter 5 μm), phenol resin and methanol at a ratio by weight of 1:4:16 was prepared. The short-carbon-fiber paper was continuously impregnated with the dispersion to ensure that the amount of the phenol resin became 110 parts by weight per 100 parts by weight of the short-carbon-fiber paper, and the impregnated paper was dried at 90° C. for 3 minutes, to obtain resin-impregnated carbon fiber paper. It was wound as a roll. As the phenol resin, a resin obtained by mixing a resol phenol resin and a novolak phenol resin at a ratio by weight of 1:1 was used.

Hot presses 74a and 74b (100-ton presses produced by K.K. Kawajiri) were set so that the hot plates 75a and 75b became parallel with each other. At a hot plate temperature of 170° C. and a plane pressure of 0.8 MPa, the presses were brought into contact with the resin-impregnated carbon fiber paper for compression treatment and kept away from each other repetitively, while the paper was intermittently carried between the hot plates, to ensure that each identical portion was heated and pressed for 6 minutes in total. In this case, the effective pressing length LP of the hot plates 75a and 75b was 1,200 mm, and the feed distance LF of the intermittently carried fiber sheet precursor 72 was 100 mm. The value of LF/LP was 0.08. That is, a 30-second cycle consisting of heating/pressing, departure of presses from each other, and carbon fiber paper feed (120 mm) was repeated to perform the compression treatment. The compressed sheet was wound as a roll by the winder 73.

The roll formed by winding the compressed resin-impregnated carbon fiber paper was heated in an oven set at 200° C. for 2 hours, for post-curing treatment of the thermosetting resin contained in the carbon fiber paper. The curing degree of the thermosetting resin after completion of post-curing treatment was 100%.

The carbon fiber paper with its resin post-cured was introduced as the fiber sheet precursor 81 into the heating furnace 89 kept in nitrogen gas atmosphere with the highest temperature as 2,000° C., and was continuously made to travel in the heating furnace, being burned at a heating rate of about 500° C./min (at 400° C./min in a temperature range up to 650° C. and at 550° C./min in a temperature range higher than 650° C.) and wound as a roll.

The physical values, production conditions and evaluation results of the obtained porous carbon substrate 1 are shown below.

Volume of the pores with pore sizes of 10 μm and less: 0.07 cc/g
Thickness: 0.13 mm
Porosity: 78%
Average fiber diameter of short carbon fibers: 7 μm
Maximum bending load: 0.59 N/cm
Maximum bending load displacement: 1.70 mm
Bending modulus of elasticity: 12 GPa
Particle diameter of carbonaceous powder: 5 μm
Amount of carbonaceous powder: 13 wt %
Average fiber length of short carbon fibers: 12 mm
Density: 0.44 g/cm$^3$
Peak pore size: 38 μm
Heating rate of carbonization step: 500° C./min
Curing degree of the thermosetting resin contained in the fiber sheet precursor: 100%
Electric resistance: 9 mΩ·cm$^2$
Fuel cell voltage: 0.49 V Example 2

A porous carbon substrate 1 was produced as described for Example 1, except that the post-curing treatment of the compressed resin-impregnated carbon fiber sheet was not performed.

The physical values, production conditions and evaluation results of the obtained porous carbon substrate 1 are shown below.

Volume of the pores with pore sizes of 10 μm and less: 0.07 cc/g
Thickness: 0.16 mm
Porosity: 83%
Average fiber diameter of short carbon fibers: 7 μm
Maximum bending load: 0.49 N/cm
Maximum bending load displacement: 1.47 mm
Bending modulus of elasticity: 9 GPa
Particle diameter of carbonaceous powder: 5 μm
Amount of carbonaceous powder: 13 wt %
Average fiber length of short carbon fibers: 12 mm
Density: 0.35 g/cm$^3$
Peak pore size: 39 μm
Heating rate of carbonization step: 500° C./min
Curing degree of the thermosetting resin contained in the fiber sheet precursor: 78%
Electric resistance: 12 mΩ·cm$^2$
Fuel cell voltage: 0.47 V

Example 3

A porous carbon substrate 1 was produced as described for Example 1, except that the heating rate in the carbonization step was about 1,600° C./min (at 1,300° C./min in a temperature range up to 650° C. and at 1,700° C./min in a temperature range of higher than 650° C.)

The physical values, production conditions and evaluation results of the obtained porous carbon substrate 1 are shown below.

Volume of the pores with pore sizes of 10 μm and less: 0.05 cc/g
Thickness: 0.14 mm
Porosity: 80%
Average fiber diameter of short carbon fibers: 7 μm
Maximum bending load: 0.67 N/cm
Maximum bending load displacement: 1.46 mm
Bending modulus of elasticity: 12 GPa
Particle diameter of carbonaceous powder: 5 μm
Amount of carbonaceous powder: 13 wt %
Average fiber length of short carbon fibers: 12 mm
Density: 0.41 g/cm$^3$
Peak pore size: 39 μm
Heating rate of carbonization step: 1,600° C./min
Curing degree of the thermosetting resin contained in the fiber sheet precursor: 100%
Electric resistance: 10 mΩ·m$^2$
Fuel cell voltage: 0.49 V

Example 4

A porous carbon substrate 1 was obtained as described for Example 2, except that the following production conditions were used.

The dispersion impregnated into the short-carbon-fiber paper was a dispersion obtained by mixing graphite, phenol resin and methanol at a ratio by weight of 1:40:160. The short-carbon-fiber paper was continuously impregnated with the dispersion to ensure that 147 parts by weight of the phenol resin were contained per 100 parts by weight of the short-carbon-fiber paper.

The physical values, production conditions and evaluation results of the obtained porous carbon substrate 1 are shown below.

Volume of the pores with pore sizes of 10 μm and less: 0.11 cc/g
Thickness: 0.15 mm
Porosity: 80%
Average fiber diameter of short carbon fibers: 7 μm
Maximum bending load: 0.31 N/cm
Maximum bending load displacement: 1.71 mm
Bending modulus of elasticity: 6 GPa
Particle diameter of carbonaceous powder: 5 μm
Amount of carbonaceous powder: 1 wt %
Average fiber length of short carbon fibers: 12 mm
Density: 0.36 g/cm$^3$
Peak pore size: 41 μm
Heating rate of carbonization step: 500° C./min
Curing degree of the thermosetting resin contained in the fiber sheet precursor: 81%
Electric resistance: 23 mΩ·cm$^2$
Fuel cell voltage: 0.46 V

Comparative Example 1

Carbon fibers (polyacrylonitrile-based carbon fibers "Torayca" T-300-6K produced by Toray Industries, Inc., average single fiber diameter 7 μm, number of single fibers 6,000) were cut at a length of 12 mm, and paper was produced continuously from them using water as a dispersion media. The paper was immersed in 10 wt % polyvinyl alcohol aqueous dispersion, and dried, to produce long short-carbon-fiber paper with a unit short-carbon-fiber weight of about 50 g/m$^2$. It was wound as a roll. The amount of deposited polyvinyl alcohol corresponded to 20 parts by weight in reference to 100 parts by weight of the short-carbon-fiber paper.

A solution obtained by mixing a phenol resin and methanol at a ratio by weight of 1:4 was prepared. The short-carbon-fiber paper was continuously impregnated with the solution to ensure that 150 parts by weight of the phenol resin was contained per 100 parts by weight of the short-carbon-fiber paper, and dried at 90° C. for 3 minutes, to obtain resin-impregnated carbon fiber paper. It was wound as a roll. As the phenol resin, a resin obtained by mixing a resol phenol resin and a novolak phenol resin at a ratio by weight of 1:1 was used.

The resin-impregnated carbon fiber paper was unwound from a roll and cut, and from the cut piece, a desired number of sheets of resin-impregnated carbon fiber paper with a predetermined size were prepared.

The hot presses 74a and 74b (100-ton presses produced by K.K. Kawajiri) were set to keep the hot plates 75a and 75b parallel to each other. At a hot plate temperature of 150° C. and at a plane pressure of 0.5 MPa, each of the carbon fiber paper sheets was positioned between the hot plates and heated and pressed for 30 minutes, as treatment for being compressed.

The compressed carbon fiber paper sheets were burned as fiber sheet precursors in a batch type heating furnace kept in nitrogen gas atmosphere at a heating rate of about 1.4° C./min (at 1° C./min in a temperature range up to 800° C. and at 2° C./min in a temperature range higher than 800° C.) with the highest temperature as 2,000° C.

The physical values, production conditions and evaluation results of the obtained porous carbon substrate are shown below.

Volume of the pores with pore sizes of 10 μm and less: 0.04 cc/g
Thickness: 0.19 mm
Porosity: 78%
Average fiber diameter of short carbon fibers: 7 μm
Maximum bending load: 0.86 N/cm
Maximum bending load displacement: 1.03 mm
Bending modulus of elasticity: 12 GPa
Average fiber length of short carbon fibers: 12 mm
Density: 0.45 g/cm$^3$
Peak pore size: 36 μm
Heating rate of carbonization step: 1.4° C./min
Curing degree of the thermosetting resin contained in the fiber sheet precursor: 55%
Electric resistance: 9 mΩ·cm$^2$
Fuel cell voltage: 0.49 V

Comparative Example 2

Porous carbon substrates were produced as described for Comparative Example 1, except that polyacrylonitrile-based carbon fibers "Torayca" T-800H-6K produced by Toray Industries, Inc., average single fiber diameter 5 μm, number of single fibers 6,000 were used.

The physical values, production conditions and evaluation results of the obtained porous carbon substrates are shown below.

Volume of the pores with pore sizes of 10 μm and less: 0.04 cc/g
Thickness: 0.18 mm
Porosity: 76%
Average fiber diameter of short carbon fibers: 5 μm
Maximum bending load: 0.64 N/cm
Maximum bending load displacement: 1.53 mm
Bending modulus of elasticity: 16 GPa
Average fiber length of short carbon fibers: 12 mm
Density: 0.48 g/cm$^3$
Peak pore size: 24 μm
Heating rate of carbonization step: 1.4° C./min
Curing degree of the thermosetting resin contained in the fiber sheet precursor: 63%
Electric resistance: 9 mΩ·cm$^2$
Fuel cell voltage: 0.33 V Comparative Example 3

A porous carbon substrate was produced under the same production conditions as described for Example 1, except that a continuous burning furnace was used in the carbonization step and that the heating rate was about 500° C./min (at 400° C./min in a temperature range up to 650° C. and at 550° C./min in a temperature range higher than 650° C.).

The physical values, production conditions and evaluation results of the obtained porous carbon substrate are shown below.

Volume of the pores with pore sizes of 10 μm and less: 0.17 cc/g
Thickness: 0.25 mm
Porosity: 84%
Average fiber diameter of short carbon fibers: 7 μm
Maximum bending load: 0.44 N/cm
Maximum bending load displacement: 0.77 mm
Bending modulus of elasticity: 6 GPa
Average fiber length of short carbon fibers: 12 mm
Density: 0.32 g/cm$^3$
Peak pore size: 40 μm
Heating rate of carbonization step: 500° C./min
Curing degree of the thermosetting resin contained in the fiber sheet precursor: 57%
Electric resistance: 39 mΩ·cm$^2$
Fuel cell voltage: 0.42 V Comparative Example 4

Porous carbon substrates were obtained as described for Comparative Example 1, except that long short-carbon-fiber paper with a unit short-carbon-fiber weight of about 25 g/m$^2$ was obtained.

The physical values, production conditions and evaluation results of the obtained porous carbon substrates are shown below.

Volume of the pores with pore sizes of 10 μm and less: 0.03 cc/g
Thickness: 0.10 mm
Porosity: 79%
Average fiber diameter of short carbon fibers: 7 μm
Maximum bending load: 0.21 N/cm
Maximum bending load displacement: 2.45 mm
Bending modulus of elasticity: 9 GPa
Average fiber length of short carbon fibers: 12 mm
Density: 0.43 g/cm$^3$
Peak pore size: 37 μm
Heating rate of carbonization step: 1.4° C./min
Curing degree of the thermosetting resin contained in the fiber sheet precursor: 62%
Electric resistance: 9 mΩ·cm$^2$
Fuel cell voltage: 0.49 V Comparative Example 5

Porous carbon substrates were obtained as described for Comparative Example 1, except that long short-carbon-fiber paper with a unit short-carbon-fiber weight of about 25 g/m$^2$ was obtained.

The physical values, production conditions and evaluation results of the obtained porous carbon substrates are shown below.

Volume of the pores with pore sizes of 10 μm and less: 0.04 cc/g
Thickness: 0.28 mm
Porosity: 78%
Average fiber diameter of short carbon fibers: 7 μm
Maximum bending load: 2.19 N/cm
Maximum bending load displacement: 0.64 mm
Bending modulus of elasticity: 12 GPa
Average fiber length of short carbon fibers: 12 mm
Density: 0.45 g/cm$^3$
Peak pore size: 36 μm
Heating rate of carbonization step: 1.4° C./min
Curing degree of the thermosetting resin contained in the fiber sheet precursor: 58%
Electric resistance: 11 mΩ·cm$^2$
Fuel cell voltage: 0.03 V Among the physical values, production conditions and evaluation results of the porous carbon substrates obtained in the above examples and comparative examples, major ones are listed in Table 3.

TABLE 3

|  | Peak pore size [μm] | Volume of pores of 10 μm and less [cc/g] | Thickness [mm] | Average fiber diameter [μm] | Maximum load [N/cm] | Maximum load displacement [mm] |
| --- | --- | --- | --- | --- | --- | --- |
| Example 1 | 38 | 0.07 | 0.13 | 7 | 0.59 | 1.70 |
| Example 2 | 39 | 0.07 | 0.16 | 7 | 0.49 | 1.47 |
| Example 3 | 39 | 0.05 | 0.14 | 7 | 0.67 | 1.46 |
| Example 4 | 41 | 0.11 | 0.15 | 7 | 0.31 | 1.71 |
| Comparative Example 1 | 36 | 0.04 | 0.19 | 7 | 0.86 | 1.03 |
| Comparative Example 2 | 24 | 0.04 | 0.18 | 5 | 0.64 | 1.53 |
| Comparative | 40 | 0.17 | 0.25 | 7 | 0.44 | 0.77 |

TABLE 3-continued

| | | | | | | |
|---|---|---|---|---|---|---|
| Example 3 | | | | | | |
| Comparative Example 4 | 37 | 0.03 | 0.10 | 7 | 0.21 | 2.45 |
| Comparative Example 5 | 36 | 0.04 | 0.28 | 7 | 2.19 | 0.64 |

| | Bending modulus of elasticity [GPa] | Heating rate [° C./min] | Curing degree of resin [%] | Electric resistance [mΩ·cm$^2$] | Cell voltage [V] |
|---|---|---|---|---|---|
| Example 1 | 12 | 500 | 100 | 9 | 0.49 |
| Example 2 | 9 | 1600 | 78 | 12 | 0.47 |
| Example 3 | 12 | 500 | 100 | 10 | 0.49 |
| Example 4 | 6 | 500 | 81 | 23 | 0.46 |
| Comparative Example 1 | 12 | 1.4 | 55 | 9 | 0.49 |
| Comparative Example 2 | 16 | 1.4 | 63 | 9 | 0.33 |
| Comparative Example 3 | 6 | 500 | 57 | 39 | 0.42 |
| Comparative Example 4 | 9 | 1.4 | 62 | 9 | 0.49 |
| Comparative Example 5 | 12 | 1.4 | 58 | 11 | 0.03 |

In the porous carbon substrates of Examples 1 through 4, since the volumes of the pores with pore sizes of 10 μm and less were in a range from 0.05 to 0.16 cc/g, the electric resistances of the substrates treated to be water-repellent, in the thickness direction were less than 30 mΩ·cm$^2$, indicating that the substances have high conductivity. Furthermore, since the substrates are adequate in maximum bending load, maximum bending load displacements and bending modulus of elasticity, they can be supplied as rolls in the production process. Moreover, according to the process for producing a porous carbon substrate of the invention, the porous carbon substrate of the invention can be produced at high productivity and at low cost.

Figure 4:
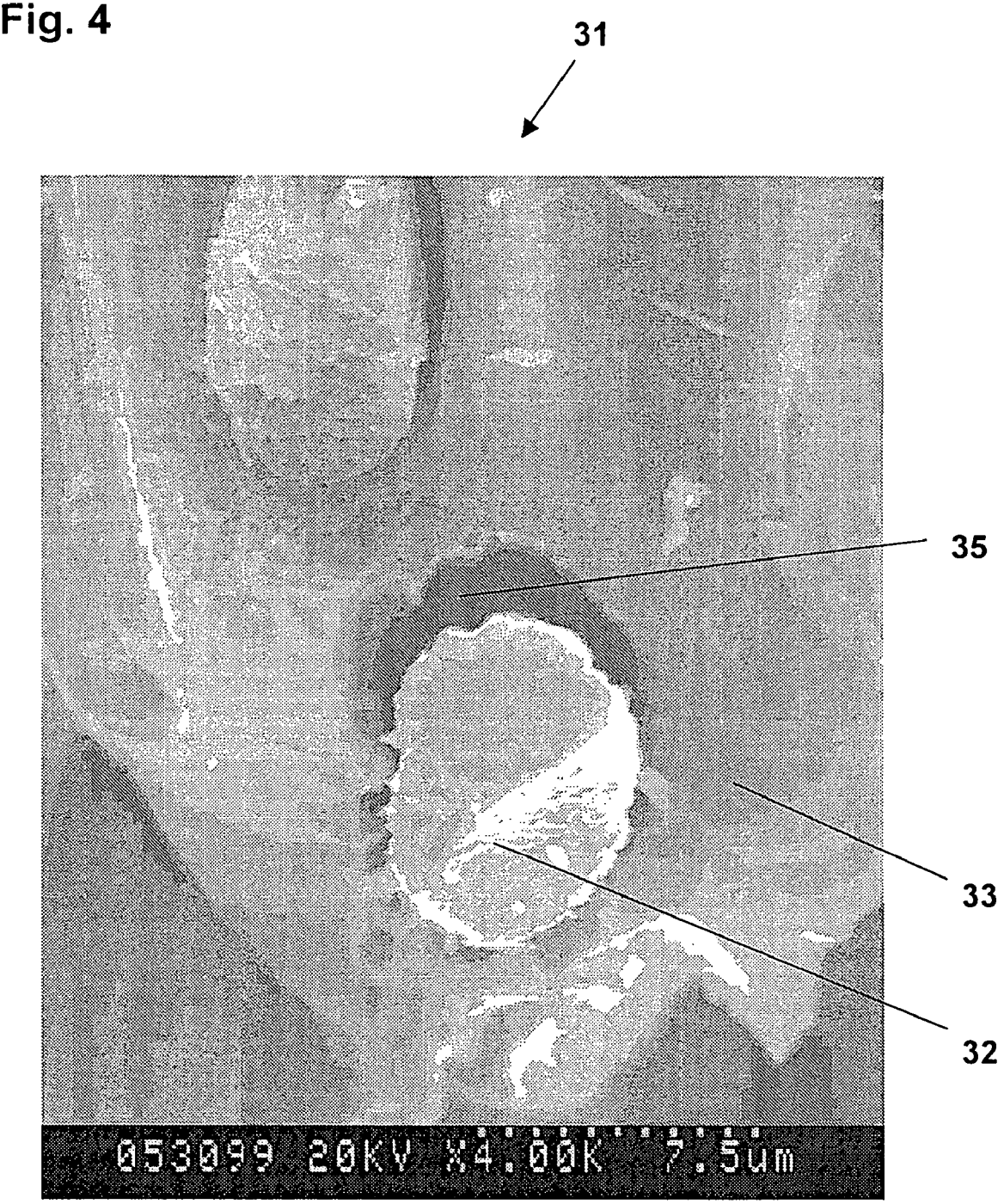
FIG. 4 is an electron microscope photograph (magnification 4,000-fold) showing the state of fibers at a separated portion occurring at an interface where short carbon fibers and a carbonized resin are bound to each other in a conventional porous carbon substrate.
Figure 5:
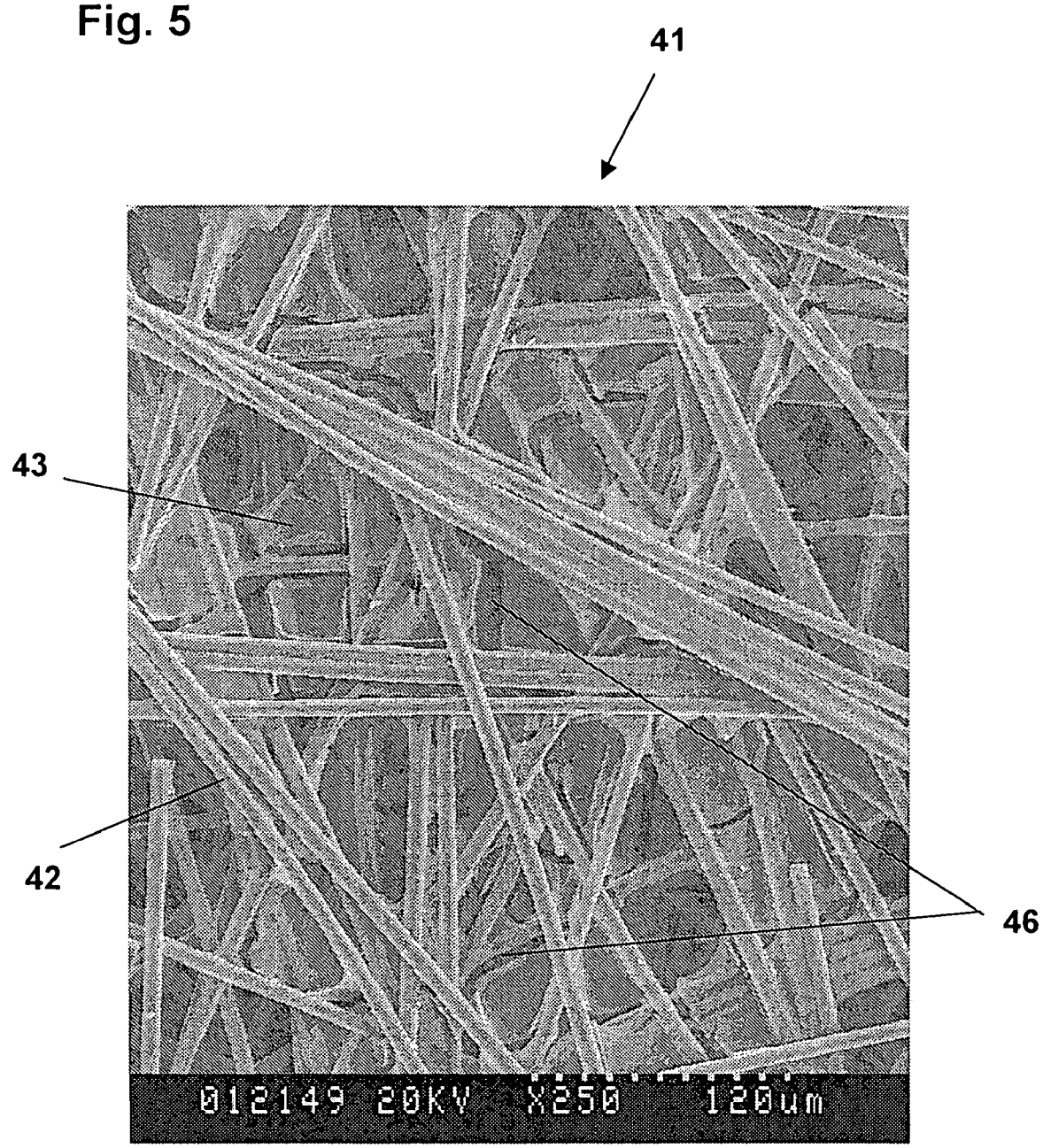
FIG. 5 is an electron microscope photograph (magnification 250-fold) showing the state of fibers at a cracked portion of a carbonized resin in a conventional porous carbon substrate.

On the other hand, the substrates obtained in Comparative Example 1 were low in the substrate productivity, since they were obtained as unit substrates to be fed one by one, though they were high in electric resistance and cell voltage. The substrate obtained in Comparative Example 3, in which merely a continuous carbonization step was used instead of the batch type carbonization step of Comparative Example 1, experienced numerous occurrences of the separation and cracking as shown in FIGS. 4 and 5. Furthermore, the volume of the pores of 10 μm and less was as large as 0.17 cc/g. Therefore, the substrate had a large electric resistance and a low cell voltage.

An electron microscope photograph of the porous carbon substrate 31 produced in Comparative Example 3 is shown in FIG. 4. In FIG. 4, the porous carbon substrate 31 has a separated portion 35 at an interface where short carbon fibers 32 and a carbonized resin 33 are bound to each other. Furthermore, an electron microscope photograph of the porous carbon substrate 41 produced in Comparative Example 3 is shown in FIG. 5. In FIG. 5, the porous carbon substrate 41 comprises a carbonized resin 43 and short carbon fibers 42 bound by it, and the carbonized resin 43 has cracked portions 46.

The substrates obtained in Comparative Example 2 using carbon fibers with an average fiber diameter of 5 μm had a high bending modulus of elasticity and a small pore size, since fibers with a small fiber diameter were used. Therefore, the substrate wound as a roll was inconvenient to handle, and could assure only a low cell voltage because of low water draining capacity and gas diffusibility.

The substrates obtained in Comparative Example 4 had a small thickness and a large maximum bending load displacement, but was likely to be broken since it was small in the maximum bending load.

The substrates obtained in Comparative Example 5 had a large thickness and a large maximum bending load, but was difficult to be wound as a roll since it was small in the maximum bending load displacement. Furthermore, owing to the influence of thickness, the water draining capacity was low, and the cell voltage was also low.

INDUSTRIAL APPLICABILITY

The porous carbon substrate of the invention is highly convenient to handle and can be supplied as a roll, having a feature that the separation at the interfaces where carbon fibers and a carbonized resin are bound to each other and the cracking of the carbonized resin slightly occur. Since the porous carbon substrate of the invention is structurally optimized in view of gas and water diffusion and transport, a solid polymeric fuel cell produced by using the substrate as a material for forming a gas diffusion material shows high cell characteristics.

The process for producing a porous carbon substrate of the invention intended for producing the porous carbon substrate of the invention comprises the step of continuously heating and pressing an intermittently carried substrate using hot plates parallel to each other, for producing a fiber sheet precursor, and the step of burning the produced fiber sheet precursor by continuously carrying it through a heating furnace. So, the process for producing a porous carbon substrate of the invention is a porous carbon substrate production process with unprecedentedly high productivity.

The invention claimed is:

1. A porous carbon substrate comprising a sheet which includes short carbon fibers dispersed in random directions and a carbonized resin binding the short carbon fibers,
   wherein the sheet has pores and wherein the volume of pores having pore sizes of 10 μm and less among the pores, per unit weight of the sheet, is in the range of 0.05 to 0.16 cc/g, and the peak pore size of the pores in the porous carbon substrate is in the range of 25 to 55 μm.

2. A porous carbon substrate according to claim 1, wherein the thickness of the porous carbon substrate is in the range of 0.10 to 0.25 mm.

3. A porous carbon substrate according to claim 1, wherein the porosity of the porous carbon substrate is in the range of 70 to 90%.

4. A porous carbon substrate according to claim 1, wherein the average fiber diameter of the short carbon fibers is in the range of 5 to 20 μm.

5. A porous carbon substrate according to claim 1, further comprising a carbonaceous powder.

6. A porous carbon substrate according to claim 5, wherein the particle diameter of the carbonaceous powder is in the range of 0.01 to 10 μm.

7. A porous carbon substrate according to claim 5, wherein the carbonaceous powder is a powder of graphite or carbon black.

8. A porous carbon substrate according to claim 1, wherein the maximum bending load of the porous carbon substrate, measured by a three-point bending test, is in the range of 0.25 to 2.0 N/cm.

9. A porous carbon substrate according to claim 1, wherein the maximum bending load displacement of the porous carbon substrate, measured by a three-point bending test, is in the range of 0.7 to 2.3 mm.

10. A porous carbon substrate according to claim 1, wherein the bending modulus of elasticity of the porous carbon substrate, measured by a three-point bending test, is in the range of 1 to 15 GPa.

11. A porous carbon substrate according to claim 1, wherein the average fiber length of the short carbon fibers is in the range of 3 to 20 mm.

12. A porous carbon substrate according to claim 1, wherein the density of the porous carbon substrate is in the range of 0.3 to 0.7 g/cm$^3$.

13. A gas diffusion material comprising a conductive gas diffusion layer formed at least on one side of the porous carbon substrate as set forth in claim 1.

14. A gas diffusion material, comprising:
a porous carbon substrate comprising a sheet which includes short carbon fibers dispersed in random directions and a carbonized resin binding the short carbon fibers,
wherein the sheet has pores; the volume of pores having pore sizes of 10 μm and less among the pores, per unit weight of the sheet, is in the range of 0.05 to 0.16 cc/g; and
a water repellent material added to the substrate.

15. A gas diffusion material comprising a conductive gas diffusion layer formed at least on one side of the gas diffusion material as set forth in claim 14.

16. A membrane-electrode assembly comprising a solid polymeric electrolyte membrane, catalyst layers containing catalyst-loaded carbon provided on both the surfaces of the membrane, and gas diffusion materials provided in contact with both the catalyst layers, characterized in that at least one of the gas diffusion materials is the gas diffusion material as set forth in claim 14.

17. The gas diffusion material according to claim 14, wherein the thickness of the porous carbon substrate is in the range of 0.10 to 0.25 mm.

18. The gas diffusion material according to claim 14, wherein the porosity of the porous carbon substrate is in the range of 70 to 90%.

19. The gas diffusion material according to claim 14, wherein the average fiber diameter of the short carbon fibers is in the range of 5 to 20 μm.

20. The gas diffusion material according to claim 14, wherein the porous carbon substrate contains a carbonaceous power, and a particle diameter of the carbonaceous powder is in the range of 0.01 to 10 μm.

21. The gas diffusion material according to claim 14, wherein the porous carbon contains a carbonaceous power, and the carbonaceous powder is a powder of graphite or carbon black.

22. A fuel cell which comprises a membrane-electrode assembly, the membrane-electrode assembly comprising:
a solid polymeric electrolyte membrane;
catalyst layers containing catalyst-loaded carbon provided on both of the surfaces of the membrane; and
gas diffusion materials provided in contact with both of the catalyst layers,
wherein at least one of the gas diffusion materials is a gas diffusion material comprising a water repellent material added to the substrate and a porous carbon substrate comprising a sheet which includes short carbon fibers dispersed in random directions and a carbonized resin binding the short carbon fibers, the sheet having pores, and the volume of pores having pore sizes of 10 μm and less among the pores, per unit weight of the sheet, being in the range of 0.05 to 0.16 cc/g.

23. The fuel cell according to claim 22, wherein a thickness of the porous carbon substrate is in the range of 0.10 to 0.25 mm.

24. The fuel cell according to claim 22, wherein a porosity of the porous carbon substrate is in the range of 70 to 90%.

25. The fuel cell according to claim 22, wherein an average fiber diameter of the short carbon fibers is in the range of 5 to 20 μm.

26. The fuel cell according to claim 22, wherein the porous carbon substrate contains a carbonaceous power, and a particle diameter of the carbonaceous powder is in the range of 0.01 to 10 μm.

27. The fuel cell according to claim 22, wherein the porous carbon substrate contains a carbonaceous power, and the carbonaceous powder is a powder of graphite or carbon black.

* * * * *